United States Patent
Shah et al.

(10) Patent No.: US 9,544,404 B2
(45) Date of Patent: Jan. 10, 2017

(54) ROHC OPTIMIZATIONS FOR BURST LOSSES

(71) Applicant: Telefonaktiebolaget L M Ericsson (publ), Stockholm (SE)

(72) Inventors: Samir Shah, Ottawa (CA); John Fong, Ottawa (CA); Adrian Turcanu, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 324 days.

(21) Appl. No.: 14/379,311

(22) PCT Filed: Aug. 15, 2014

(86) PCT No.: PCT/IB2014/063941
§ 371 (c)(1),
(2) Date: Aug. 18, 2014

(87) PCT Pub. No.: WO2016/024148
PCT Pub. Date: Feb. 18, 2016

(65) Prior Publication Data
US 2016/0241685 A1 Aug. 18, 2016

(51) Int. Cl.
*H04L 29/14* (2006.01)
*H04L 29/06* (2006.01)
(Continued)

(52) U.S. Cl.
CPC ............. *H04L 69/40* (2013.01); *H04L 1/1812* (2013.01); *H04L 47/34* (2013.01); *H04L 69/04* (2013.01); *H04L 69/322* (2013.01); *H04W 80/04* (2013.01)

(58) Field of Classification Search
CPC ........ H04L 69/40; H04L 69/322; H04L 69/04; H04L 7/04; H04L 7/048; H04L 47/34; H04L 1/1812; H04W 28/06; H04W 28/0268; H04W 28/0273
See application file for complete search history.

(56) References Cited

U.S. PATENT DOCUMENTS 6,300,887 B1* 10/2001 Le .................. H04L 29/06
341/60
2002/0031149 A1* 3/2002 Hata ................ H04L 29/06
370/537
(Continued)

FOREIGN PATENT DOCUMENTS

WO 0051307 A1 8/2000

OTHER PUBLICATIONS

Invitation to Pay Additional Fees and Partial International Search Report for PCT/IB2014/063941, mailed May 8, 2015, 4 pages.
(Continued)

*Primary Examiner* — Ian N Moore
*Assistant Examiner* — Phong La
(74) *Attorney, Agent, or Firm* — Withrow + Terranova, PLLC

(57) ABSTRACT

Systems and methods are disclosed for optimizing Robust Header Compression (RoHC) to protect against context desynchronization resulting from a burst of lost packets. In one embodiment, a method of operation of a radio node to adapt a RoHC compressor of a radio node based on a transmit channel quality metric is provided. In another embodiment, systems and methods relating to improved RoHC SN decoding are disclosed. In one embodiment, a method of operation of a radio node includes determining a size of a Packet Data Convergence Protocol (PDCP) Sequence Number (SN) gap for a radio link between the radio node and a second radio node, and performing RoHC SN decoding based on the size of the PDCP SN gap.

18 Claims, 11 Drawing Sheets

(51) Int. Cl.
*H04L 1/18* (2006.01)
*H04L 12/801* (2013.01)
*H04L 29/08* (2006.01)
*H04W 80/04* (2009.01)

(56) References Cited

U.S. PATENT DOCUMENTS

| | | | | |
|---|---|---|---|---|
| 2004/0033801 | A1* | 2/2004 | Yi | H04L 69/04 455/428 |
| 2005/0195750 | A1* | 9/2005 | Le | H04L 1/1809 370/252 |
| 2008/0123655 | A1* | 5/2008 | Kim | H04L 1/1867 370/394 |
| 2008/0151861 | A1 | 6/2008 | Zhang | |
| 2009/0103445 | A1* | 4/2009 | Sammour | H04L 1/1812 370/252 |
| 2010/0322193 | A1* | 12/2010 | Hu | H04B 7/155 370/331 |
| 2011/0128908 | A1* | 6/2011 | Lee | H04L 29/06 370/328 |
| 2011/0149790 | A1* | 6/2011 | Mabuchi | H04L 1/0034 370/252 |
| 2011/0263221 | A1* | 10/2011 | Yi | H04L 1/0061 455/410 |
| 2012/0106413 | A1* | 5/2012 | Huang | H04L 1/0079 370/310 |
| 2012/0307842 | A1* | 12/2012 | Petrov | H04N 21/23608 370/474 |
| 2013/0064186 | A1* | 3/2013 | Wang | H04W 12/08 370/328 |
| 2013/0182640 | A1* | 7/2013 | Liu | H04W 28/06 370/328 |
| 2015/0043435 | A1* | 2/2015 | Blankenship | H04L 69/322 370/329 |

OTHER PUBLICATIONS

International Search Report and Written Opinion for PCT/IB2014/063941, mailed Jul. 23, 2015, 15 pages.
Author Unknown, "Technical Specification Group Services and System Aspects; 3GPP System Architecture Evolution (SAE); Security architecture (Release 12)," Technical Specification 33.401, Version 12.11.0, 3GPP Organizational Partners, Jun. 2014, 127 pages.
Author Unknown, "Technical Specification Group Radio Access Network; Evolved Universal Terrestrial Radio Access (E-UTRA); Packet Data Convergence Protocol (PDCP) specification (Release 11)," Technical Specification 36.323, Version 11.2.0, 3GPP Organizational Partners, Mar. 2013, 27 pages.
Bormann, C. et al., "RObust Header Compression (ROHC): Framework and four profiles: RTP, UDP, ESP, and uncompressed," Request for Comments 3095, Jul. 2001, 168 pages.
Author Unknown, "The concept of robust header compression, ROHC," EFFNET AB White Paper, www.effnet.com, Feb. 2004, 16 pages.

* cited by examiner

ROHC OPTIMIZATIONS FOR BURST LOSSES

This application is a 35 U.S.C. §371 national phase filing of International Application No. PCT/IB2014/063941, filed Aug. 15, 2014, the disclosure of which is incorporated herein by reference in its entirety.

FIELD OF THE DISCLOSURE

The present disclosure relates to Robust Header Compression (RoHC) and, in particular, RoHC optimizations to protect against context desynchronization resulting from a burst of lost packets.

BACKGROUND

Robust Header Compression (RoHC) is used in $3^{rd}$ Generation Partnership Project (3GPP) Long Term Evolution (LTE) networks to minimize the amount of information transmitted over the air. RoHC is defined in Internet Engineering Task Force (IETF) Request for Comments (RFC) 3095, "RObust Header Compression (ROHC): Framework and four profiles: RTP, UDP, ESP, and uncompressed." In particular, in 3GPP LTE, RoHC is utilized in the Packet Data Convergence Protocol (PDCP) layer to minimize the amount of information in Internet Protocol (IP)/User Datagram Protocol (UDP)/Real-Time Protocol (RTP) headers by taking advantage of the repetitive (correlated) nature of some of the fields in the IP/UDP/RTP headers. This is particularly beneficial for Voice over IP (VoIP) traffic where the amount of data being transmitted is typically much smaller than the size of the uncompressed IP/UDP/RTP headers. RoHC defines a "compressor," which is the sender of RoHC compressed packets, and a "decompressor," which is the receiver of the RoHC compressed packets.

RoHC uses a compression technique that eliminates or minimizes fields that have to be sent to the decompressor. In particular, RoHC uses a compression technique that eliminates or minimizes fields that are static (do not change) or that are correlated to a field called "Sequence Number" (SN), which is more specifically referred to herein as a RoHC SN. Uncorrelated fields are sent "as is" (or uncompressed). At all times, the compressor and decompressor maintain "state information" that describes what fields are inferred and how those fields are correlated to the SN. This state information is also referred to as context information or as a context of the compressor/decompressor. In consequence, in the highest state of compression, it is enough for the compressor to only send the SN and the uncorrelated fields to allow the decompressor to correctly reconstruct the original packet.

In RoHC, the SN is also usually compressed in that the SN is not sent in its entirety. In particular, for the SN field, RoHC uses Window-based Least Significant Bits (W-LSB) encoding. In essence, W-LSB encoding sends only the last $k\_c$ least significant bits of the SN field, where $k\_c$ is a computed value. The smaller the size of $k\_c$, the more efficient the compression.

When the compressor and the decompressor operate at a compression level of $k\_c$ least significant bits for the SN field, a loss of a burst of $2^{k\_c}$ packets will result in an incorrect inference of the value of bit $k\_c+1$ of the SN field at the decompressor and, therefore, an error in decompression (or decoding) of the true SN value. RFC 3095, Section 5.3.2.2.4, entitled "Correction of SN LSB wraparound," describes a repairing mechanism for the SN after a decompression failure. In particular, after a decompression failure, an attempt is made to add a value of $2^{k\_c}$ to the last good reference SN at the decompressor (i.e., the full SN value for the last successfully decompressed packet at the decompressor). The decompressor then retries decompression, or decoding, of the W-LSB encoded SN using the new reference SN. As a consequence, this standard repair mechanism protects against loss of a burst of $2^{k\_c+1}$ packets. For the most efficient compression case, where RoHC Packet Type UO-0 packets are sent, the $k\_c$ value is 4. Thus, in this case, the standard repair mechanism can protect against loss of a burst of at most $2^5=32$ packets. Furthermore, changes in the pattern of correlated fields may occur during the burst of lost packets. While the compressor will flag those changes to the decompressor, the packets that are flagging the changes are lost. As a result, the decompressor will not receive the changes in the correlation patterns, which leads to some fields being incorrectly reconstructed during decompression, while other fields may be correctly reconstructed during decompression.

For radio links in general and radio links in a cellular communications network in particular, the communication channel is subject to temporary fading as well as interference from neighbor cells. As a result, bursts of lost packets are a real possibility. In particular, in a cellular communications network, the possibility of bursts of lost packets increases as the user device, or mobile terminal, approaches the edge of a cell. Further, in some cases, the size of a burst of lost packets may exceed $2^{k\_c+1}$ packets, which leads to loss of "synchronicity" between the decompressor and the compressor (i.e., the decompressor is no longer able to successfully decompress packets from the compressor). This is referred to as context desynchronization.

When the decompressor loses synchronicity with the compressor, the RoHC standard defines a mechanism for recovery. The recovery mechanism entails an exchange of signals between the compressor and the decompressor followed by reverting to a state where packets are sent with little or no compression. This recovery mechanism is costly. In particular, the recovery mechanism requires extra signaling between the decompressor and the compressor (e.g., transmitting feedback negative acknowledgements) to inform the compressor of the loss of synchronization. The compressor must then react by generating and transmitting less compressed RoHC packet types. In addition, the recovery mechanism results in a delay before the compressor and the decompressor are able to return back to the RoHC peer-to-peer highest possible compression state due to round-trip delays associated with signaling, reaction to the received signals at the compressor, and possibly acknowledgements sent to the new RoHC packet types generated by the compressor. The recovery mechanism also results in wasted radio link, or air link, bandwidth because end user packets are discarded while the compressor and the decompressor attempt to regain synchronicity and reach the highest compression state. Further, the first few user packets sent by the compressor when attempting to regain synchronicity are sent in a less compressed form. In the worst case, the first few user packets when attempting to regain synchronicity are sent as uncompressed Initialization and Refresh (IR) packets. The less compressed or uncompressed packets translate to wasted air link bandwidth. The recovery mechanism also requires a substantial amount of time to regain synchronicity between the compressor and the decompressor. Lastly, the recovery mechanism results in a poor end-user experience in terms of the percentage of correctly decompressed packets being received and the time taken to recover from a burst of lost packets.

In light of the discussion above, there is a need for systems and methods for RoHC optimization to more efficiently and proactively protect against context desynchronization resulting from a burst of lost packets.

SUMMARY

Systems and methods are disclosed for optimizing Robust Header Compression (RoHC) to protect against context desynchronization resulting from a burst of lost packets. In one embodiment, a method of operation of a radio node to adapt a RoHC compressor of a radio node based on a transmit channel quality metric is provided. In one embodiment, the method of operation of the radio node includes computing a value for a transmit channel quality metric based on channel quality information for a transmit channel between the radio node and a second radio node, and adapting a RoHC compressor for a link between the radio node and the second radio node based on the value for the transmit channel quality metric. In this manner, the RoHC compressor can be adapted based on the transmit channel quality metric to, in some embodiments, reduce the likelihood of context desynchronization between the RoHC compressor of the radio node and a RoHC decompressor of the second radio node when operating under poor or less than ideal transmit channel quality conditions.

In one embodiment, adapting the RoHC compressor includes computing a number of least significant bits of a RoHC Sequence Number (SN) to be included in compressed RoHC packets generated by the RoHC compressor based on the value for the transmit channel quality metric. Further, in one embodiment, adapting the RoHC compressor further includes selecting a RoHC packet type for compressed RoHC packets generated by the RoHC compressor based on the number of least significant bits of the RoHC SN to be included in the compressed RoHC packets computed based on the value for the transmit channel quality metric.

In one embodiment, adapting the RoHC compressor includes selecting a RoHC packet type for compressed RoHC packets generated by the RoHC compressor based on the value for the transmit channel quality metric.

In one embodiment, the channel quality metric is indicative of a likelihood that a next transmitted compressed RoHC packet will not be received successfully by a RoHC decompressor of the second radio node. Further, in one embodiment, adapting the RoHC compressor includes receiving a new packet for RoHC compression with a value (v) for a RoHC SN used by the RoHC compressor and determining whether the likelihood that the next transmitted compressed RoHC packet will not be received successfully by the RoHC decompressor of the second radio node is greater than a threshold. Adapting the RoHC compressor further includes incrementing a counter of a number of compressed RoHC packets transmitted consecutively that have been determined to have likely been lost if the likelihood that the next transmitted compressed RoHC packet will not be received successfully by the RoHC decompressor of the second radio node is greater than the threshold, and determining whether the counter of the number of compressed RoHC packets transmitted consecutively that have been determined to have likely been lost is greater than or equal to a lost packet threshold. Adapting the RoHC compressor further includes, if the counter of the number of compressed RoHC packets transmitted consecutively that have been determined to have likely been lost is determined to be greater than or equal to the lost packet threshold, determining a new value for k_c based on a value (v_ref_g) of the RoHC SN for a last compressed RoHC packet determined to have likely been successfully decoded by the RoHC decompressor of the second radio node and the value (v) for the RoHC SN for the new packet for RoHC compression, where k_c is a number of least significant bits of the RoHC SN to be included in compressed RoHC packets. Adapting the RoHC compressor further includes selecting a RoHC packet type for compressed RoHC packets generated by the RoHC compressor of the radio node based on the new value for k_c, and processing the new packet to generate a new compressed RoHC packet of the selected RoHC packet type for transmission to the second radio node.

In one embodiment, adapting the RoHC compressor further includes, if the counter of the number of compressed RoHC packets transmitted consecutively that have been determined to have likely been lost is determined to not be greater than or equal to $2^{k\_c}$ for the current value of k_c, determining the new value for k_c based on a value (v_ref_c) of the RoHC SN for a last compressed RoHC packet and the value (v) for the RoHC SN for the new packet for RoHC compression. In one embodiment, the threshold is $2^{k\_c}$ for the current value of k_c used by the RoHC compressor.

In one embodiment, computing the value for the transmit channel quality metric includes computing the value for the transmit channel quality metric based on a current value of the channel quality information for the transmit channel and one or more previous values of the channel quality information for the transmit channel. Further, in one embodiment, the transmit channel quality metric is a number of complete Hybrid Automatic Repeat Request (HARQ) failures compared to HARQ successes or complete HARQ attempts, and computing the value for the transmit channel quality metric based on the current value of the channel quality information for the transmit channel and the one or more previous values of the channel quality information for the transmit channel includes computing the value for the transmit channel quality metric as an exponentially weighted moving average of the number of complete HARQ failures compared to HARQ successes or complete HARQ attempts.

In one embodiment, computing the value for the transmit channel quality metric includes obtaining a new value for the channel quality information for the transmit channel, computing the value for the transmit channel quality metric based on the new value for the channel quality information and the one or more previous values for the channel quality information, making the value for the transmit channel quality metric available to the RoHC compressor, and repeating the steps of obtaining a new value for the channel quality information for the transmit channel, computing the value for the transmit channel quality metric, and making the value for the transmit channel quality metric available to the RoHC compressor.

In another embodiment, a radio node is provided that operates according to any of the methods described above.

In another embodiment, systems and methods relating to improved RoHC SN decoding are disclosed. In one embodiment, a method of operation of a radio node includes determining the size of a receiving Packet Data Convergence Protocol (PDCP) SN gap for a radio link between the radio node and a second radio node, and performing RoHC SN decoding based on the size of the PDCP SN gap. In one embodiment, decoding the RoHC SN based on the size of the PDCP SN gap enables successful decoding of the RoHC SN even after a burst of more than $2^{k\_d}$ lost packets.

In one embodiment, performing RoHC SN decoding based on the size of the PDCP SN gap includes determining whether the size of the PDCP SN gap is greater than a threshold gap size, and performing RoHC SN decoding for a received PDCP Protocol Data Unit (PDU) using the size of the PDCP SN gap if the size of the PDCP SN gap is greater than the threshold gap size. Further, in one embodiment, performing RoHC SN decoding based on the size of the PDCP SN gap further includes determining the RoHC SN for the received RoHC compressed PDCP PDU without using the size of the PDCP SN gap if the size of the PDCP SN gap is greater than the threshold.

In one embodiment, the threshold gap size is $2^{k\_d}$ for the current value of k_d used by a RoHC decompressor of the radio node, where k_d is a number of least significant bits of the RoHC SN included in RoHC compressed PDCP PDUs processed by the RoHC decompressor.

In one embodiment, performing RoHC SN decoding based on the size of the PDCP SN gap includes receiving a new RoHC compressed PDCP PDU for RoHC decompression, determining whether the size of the PDCP SN gap is greater than a threshold gap size, computing a value for a RoHC SN for the new RoHC compressed PDCP PDU based on the size of the PDCP SN gap if the size of the PDCP SN gap is greater than or equal to the threshold gap size, and performing RoHC decompression based on the value computed for the RoHC SN for the new RoHC compressed PDCP PDU. Further, in one embodiment, computing the value for the RoHC SN for the new RoHC compressed PDCP PDU based on the size of the PDCP SN gap includes computing a predicted reference value as the sum of a value of the RoHC SN for a last successfully decoded RoHC compressed PDCP PDU, the size of the PDCP SN gap, and a value for a decompression failure counter, the value for the decompression failure counter being a number of RoHC compressed PDCP PDUs that failed decompression since the last successfully decoded RoHC compressed PDCP PDU was received. Computing the value for the RoHC SN for the new RoHC compressed PDCP PDU further includes computing the value for the RoHC SN for the new RoHC compressed PDCP PDU based on the predicted reference value and Window-based Least Significant Bit (W-LSB) encoded RoHC SN value contained in the new RoHC compressed PDCP PDU.

In one embodiment, the method of operation of the radio node further includes determining whether RoHC decompression failed for the new RoHC compressed PDCP PDU, incrementing the value for the decompression failure counter if RoHC decompression failed, and resetting the decompression failure counter if RoHC decompression succeeded.

In one embodiment, performing RoHC decoding based on the size of the PDCP SN gap further includes computing the value of the RoHC SN for the new RoHC compressed PDCP PDU without using the size of the PDCP SN gap if the size of the PDCP SN gap is less than the threshold gap size.

In one embodiment, performing RoHC SN decoding based on the size of the PDCP SN gap further includes, prior to computing the value of the RoHC SN for the new RoHC compressed PDCP PDU, determining whether k_d is greater than or equal to a size of the PDCP SN, where k_d is a number of least significant bits of the RoHC SN included in RoHC compressed PDCP PDUs processed by the RoHC decompressor of the radio node. If k_d is not greater than or equal to the size of the PDCP SN, the method proceeds to perform the step of computing the value for the RoHC SN for the new RoHC compressed PDCP PDU based on the size of the PDCP SN gap if the size of the PDCP SN gap is greater than or equal to the threshold gap size. If k_d is greater than or equal to the size of the PDCP SN, the value of the RoHC SN for the new RoHC compressed PDCP PDU is computed without using the size of the PDCP SN gap if the size of the PDCP SN gap is less than the threshold gap size.

In one embodiment, the threshold gap size is $2^{k\_d}$.

In one embodiment, determining the size of the PDCP SN gap for the radio link between the radio node and the second radio node includes computing a count value for a received new PDCP PDU, the count value being composed of a Hyper Frame Number (HFN) maintained by a PDCP entity of the radio node for the radio link between the radio node and the second radio node and a PDCP SN contained in the new PDCP PDU. The size of the PDCP SN gap is then computed as:

$$g = \text{COUNT} - \text{COUNT\_prev} + 1,$$

where COUNT is the count value computed for the new PDCP PDU and COUNT_prev is a count value computed for a previously received PDCP PDU.

In one embodiment, performing RoHC SN decoding based on the size of the PDCP SN gap is performed by the RoHC decompressor of the radio node for the radio link between the radio node and the second radio node, determining the size of the PDCP SN gap is performed by a PDCP entity of the radio node, and the method further includes making the size of the PDCP SN gap determined by the PDCP entity available to the RoHC decompressor.

In another embodiment, a radio node that operates according to any of the methods described above related to RoHC SN decoding is provided.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
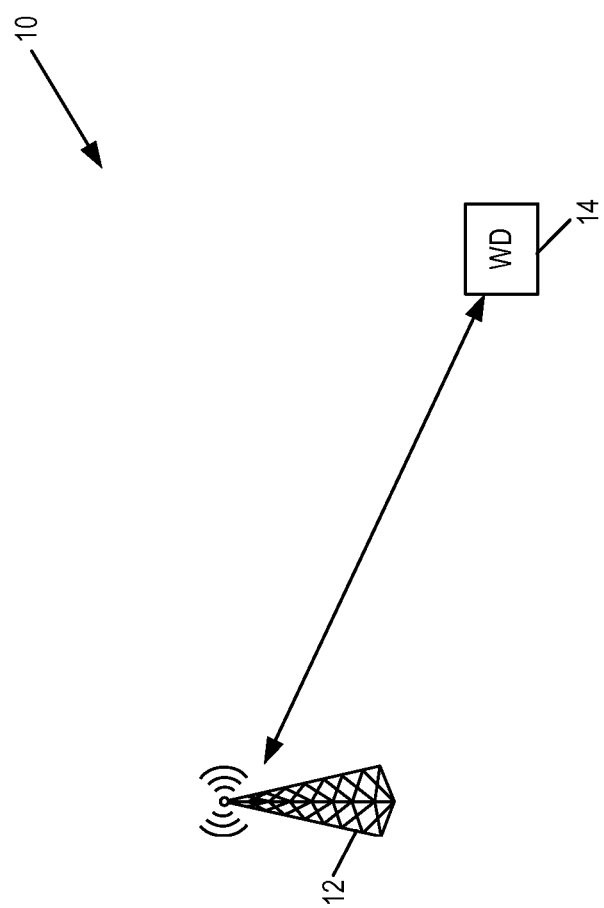
FIG. 1 illustrates a cellular communications network according to one embodiment of the present disclosure.

Systems and methods are disclosed herein for optimizing Robust Header Compression (RoHC) to protect against context desynchronization resulting from a burst of lost packets. In this regard, FIG. 1 illustrates a cellular network 10 that includes a base station 12 and a wireless device 14 that operate to provide RoHC compression and decompression according to some embodiments of the present disclosure. In the embodiments described herein, the cellular network 10 is a $3^{rd}$ Generation Partnership Projection (3GPP) Long Term Evolution (LTE) network and, as such, the base station 12 may be referred to as an enhanced Node B (eNB), and the wireless device 14 may be referred to as a User Equipment (UE). Further, the embodiments described herein specifically relate to RoHC within the Packet Data Convergence Protocol (PDCP) layer of the protocol stack of the wireless device 14 and/or the base station 12. Note however that the concepts disclosed herein are not limited to 3GPP LTE or RoHC within the PDCP layer of the LTE protocol stack. Rather, the RoHC techniques disclosed herein may be implemented in any suitable type of cellular communications network, any suitable wireless system, or any other communication system that utilizes RoHC, particularly over a lossy link.

Figure 2:
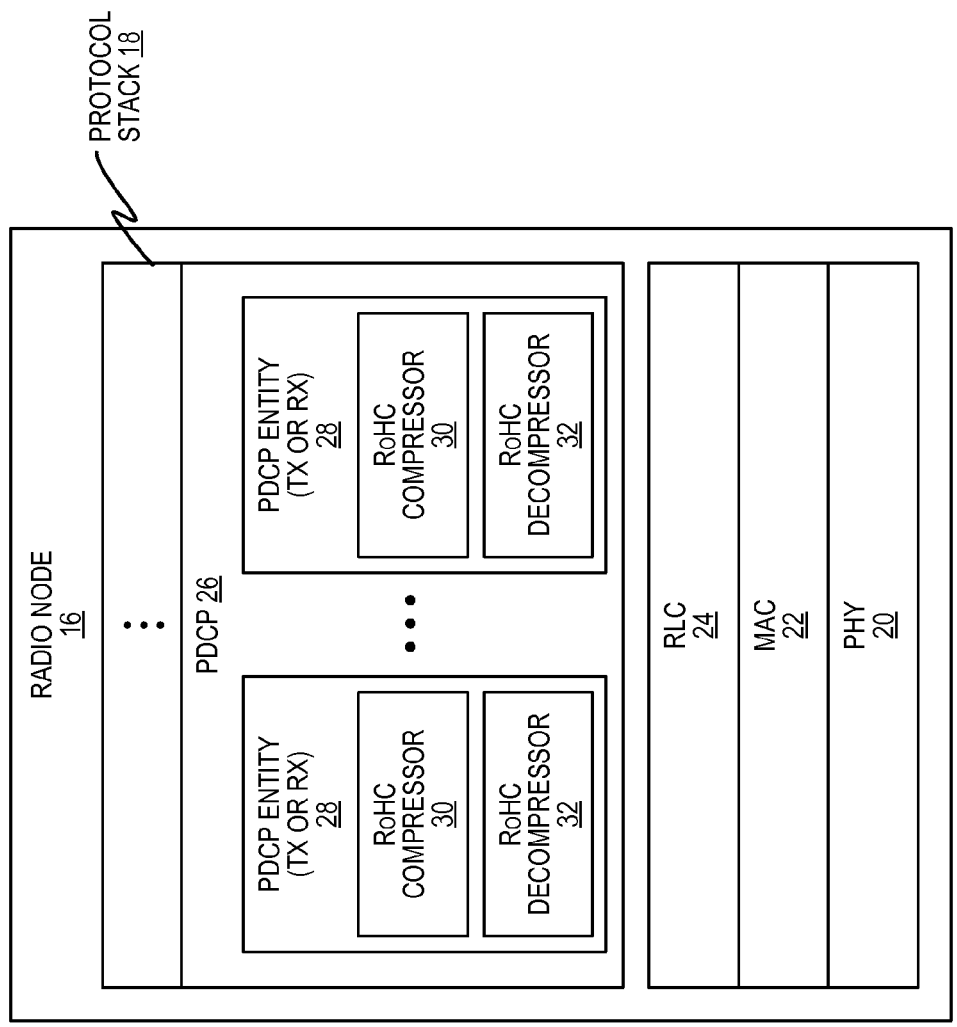
FIG. 2 illustrates a radio node according to one embodiment of the present disclosure.

FIG. 2 illustrates a radio node 16 according to one embodiment of the present disclosure. The radio node 16 may be, e.g., the base station 12 or the wireless device 14 of FIG. 1. However, the radio node 16 is not limited thereto. As illustrated, the radio node 16 includes a protocol stack 18, which is implemented as a combination of hardware and software. The protocol stack 18 includes many layers including a Physical (PHY) layer 20, a Medium Access Control (MAC) layer 22, a Radio Link Control (RLC) layer 24, and a PDCP layer 26. The PHY layer 20 performs coding/decoding, modulation/demodulation, multi-antenna mapping, etc. The MAC layer 22 performs multiplexing of logical channels, hybrid Automatic Repeat Request (ARQ) retransmissions, and uplink and downlink scheduling. The RLC layer 24 performs functions such as segmentation/concatenation, retransmission handling, duplicate detection, and in-sequence delivery to higher layers. The RLC layer 24 includes one RLC entity per radio bearer configured for a UE.

The functionality of the PDCP layer 26 for LTE is defined in 3GPP Technical Specification (TS) 36.323 V11.2.0, which is entitled "Technical Specification Group Radio Access Network; Evolved Universal Terrestrial Radio Access (E-UTRA); Packet Data Convergence Protocol (PDCP) specification (Release 11)." The PDCP layer 26 supports functions such as, for example, header compression and decompression of Internet Protocol (IP) packets using the RoHC protocol, transfer of data (e.g., user plane data or control plane data), maintenance of PDCP Sequence Numbers (SNs), in-sequence delivery of upper layer Protocol Data Units (PDUs) at re-establishment of lower layers, ciphering and deciphering of user plane data and control plane data, integrity protection and integrity verification of control plane data, timer based discard, etc. RoHC is defined in Internet Engineering Task Force (IETF) Request for Comments (RFC) 3095, "RObust Header Compression (ROHC): Framework and four profiles: RTP, UDP, ESP, and uncompressed," which, while non-essential for understanding and describing the systems and methods disclosed herein, is hereby incorporated by reference in its entirety.

As illustrated, the PDCP layer 26 includes a number of PDCP entities 28, each including at most one RoHC compressor 30 and at most one RoHC decompressor 32. Thus, a particular PDCP entity 28 may include a RoHC compressor 30, a RoHC decompressor 32, or both a RoHC compressor 30 and a RoHC decompressor 32. As defined in 3GPP TS 36.323 V11.2.0, each radio bearer (i.e., Data Radio Bearer (DRB) and Service Radio Bearer (SRB) except SRB0) is associated with one PDCP entity 28. In other words, each of the PDCP entities 28 carries data for one radio bearer. Each PDCP entity 28 is associated with either one or two RLC entities, depending on the RLC mode and whether the radio bearer is unidirectional or bidirectional. Each PDCP entity 28 is associated with either the control plane or the user plane depending on whether the corresponding radio bearer is carrying data for the control plane or the user plane.

The RoHC standard defines three modes of operation, namely, a Unidirectional Mode (U-MODE), a bidirectional Optimistic Mode (O-MODE), and a bidirectional Reliable Mode (R-MODE). Since LTE radio links are bidirectional, the U-MODE only occurs at initialization. R-MODE is intended for lossy links, while O-MODE is designed for quality links. Transition between modes can be done on the fly, following a negotiation between the RoHC compressor 30 of the PDCP entity 28 of the transmitting radio node 16 (e.g., the wireless device 14) and the RoHC decompressor 32 of the receiving PDCP entity 28 of the receiving radio node (e.g., the base station 12). R-MODE is less efficient than O-MODE. In particular, R-MODE requires more signaling between the RoHC compressor 30 of the PDCP entity 28 of the transmitting radio node 16 and the RoHC decompressor 32 of the receiving PDCP entity 28 of the receiving radio node 16, as well as more overhead associated with each user packet.

While O-MODE is supported by the vast majority LTE networks, R-MODE is not considered an ideal mode because of its more intensive usage of the feedback channel, which defeats the intent of using RoHC as a means to reduce bandwidth usage. If both end-points of a radio link do not support R-MODE, then a transition to R-MODE is not possible and both the RoHC compressor 30 of the PDCP entity 28 of the transmitting radio node 16 and the RoHC decompressor 32 of the receiving PDCP entity 28 of the receiving radio node 16 must operate in O-MODE, which provides less protection when operating in less than ideal conditions. The embodiments described herein can be utilized to improve performance when operating in both R-MODE and O-MODE. However, the embodiments are particularly beneficial when operating in O-MODE.

Figure 3:
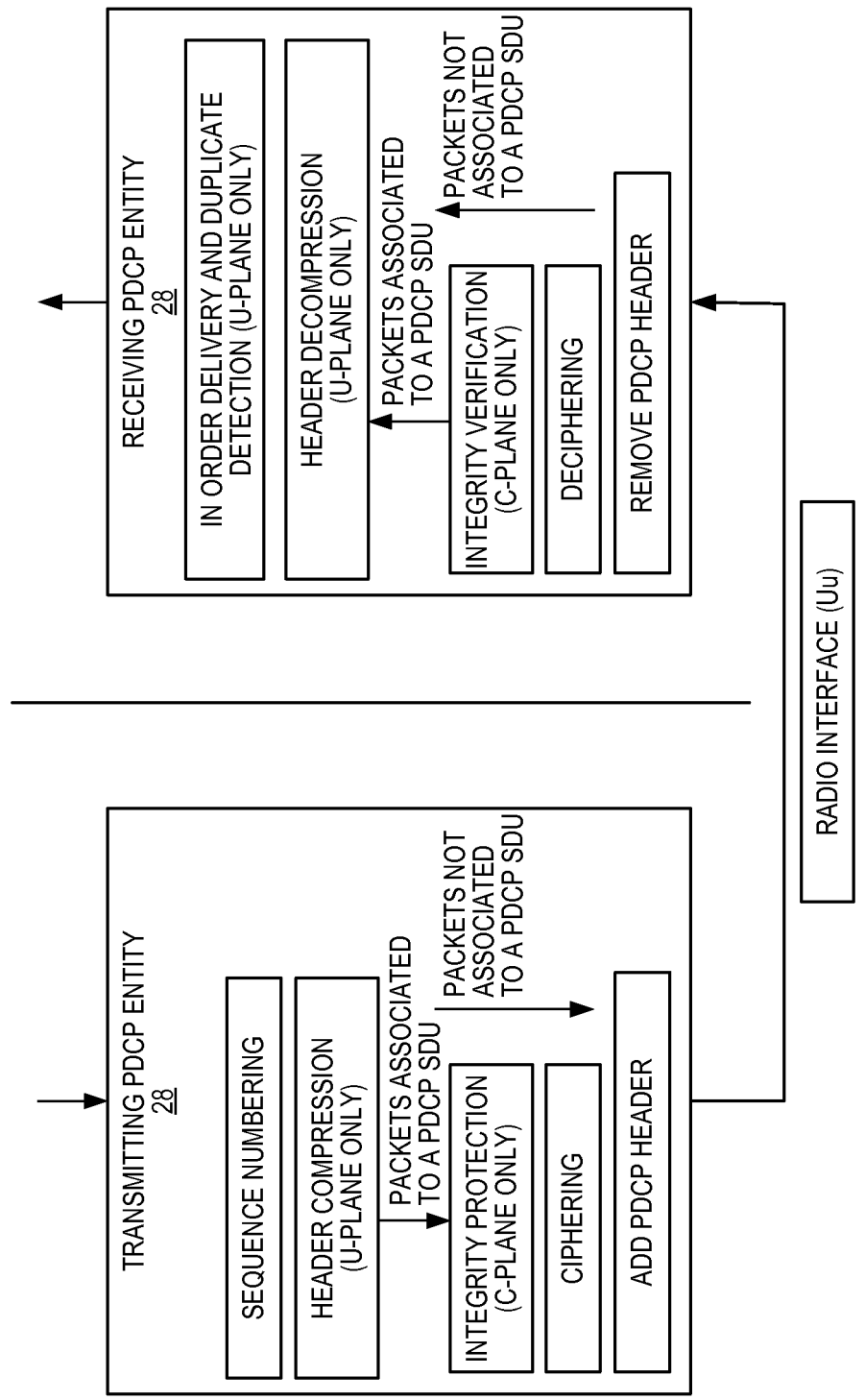
FIG. 3 is a block diagram that illustrates the operation of a transmitting Protocol Data Convergence Protocol (PDCP) entity (which may be referred to as a PDCP transmitter) and a receiving PDCP entity (which may be referred to as a PDCP receiver)

FIG. 3 illustrates the operation of two PDCP entities 28 of two radio nodes 16 to provide communication over a corresponding radio link. In this case, one of the PDCP entities 28 is transmitting data and, as such, is referred to as a transmitting PDCP entity 28, and the other PDCP entity 28 is receiving the transmitted data and, as such, is referred to as a receiving PDCP entity 28. In this example, the transmitting PDCP entity 28 is at one radio node 16 (e.g., the wireless device 14 (or UE)), and the receiving PDCP entity 28 is at another radio node 16 (e.g., the base station 12 (or eNB)). As illustrated, the transmitting PDCP entity 28 receives data to be transmitted on a corresponding radio bearer. This data is an IP packet and, in some embodiments, an IP/User Datagram Protocol (UDP)/Real-Time Protocol (RTP) packet. Upon receiving the IP packet, the transmitting PDCP entity 28 determines a new PDCP SN for a new PDCP PDU to carry the IP packet. In general, PDCP SNs are assigned by the transmitting PDCP entity 28 to PDCP PDUs in sequential order. Thus, the new PDCP SN is determined by incrementing the previous PDCP SN by 1. The PDCP SN is a 5, 7, or 12 bit value that together with a Hyper Frame Number (HFN) maintained by the transmitting PDCP entity 28 form a full 32 bit SN referred to as COUNT. As discussed below, the SN COUNT is used for ciphering by the transmitting PDCP entity 28 and deciphering by the receiving PDCP entity 28.

If the data to be transmitted is user plane data (i.e., if the radio bearer is associated with the user plane) and RoHC is configured for the radio bearer, the transmitting PDCP entity 28, and in particular the RoHC compressor 30 of the transmitting PDCP entity 28, performs RoHC header compression. In general, the RoHC compressor 30 operates to compress the IP/UDP/RTP headers by eliminating or minimizing fields from the IP/UDP/RTP headers that are static or correlated to a field referred to as a RoHC SN or Master SN (MSN). Uncorrelated fields are sent "as is" (or uncompressed) because they cannot be compressed using RoHC. The RoHC compressor 30 of the transmitting PDCP entity 28 and the RoHC decompressor 32 of the receiving PDCP entity 28 maintain "state information" that describes what fields are eliminated and how those fields are correlated to the RoHC SN. This state information is also referred to as context information, or a context of the compressor/decompressor. In the highest state of compression, rather than sending the full IP/UDP/RTP headers, the RoHC compressor 30 transmits only the RoHC SN (in particular a compressed RoHC SN) and the uncorrelated fields of the IP/UDP/RTP headers.

Importantly, in RoHC, the RoHC SN is also compressed in that the RoHC SN is not sent in its entirety. In particular, for the RoHC SN field, RoHC uses Window-based Least Significant Bits (W-LSB) encoding. In essence, W-LSB encoding sends only the last k_c least significant bits of the RoHC SN field. The smaller the size of k_c, the more efficient the compression. Currently, in LTE, the value of k_c may be 4 (for UO-0 and UO-1-TS), 6 (UOR-2), 7 (UO1-ID-EXT0 and UO1-ID-EXT1), 9 (UOR-2-EXT0 and UOR-2-EXT1), 12 (UO1-ID-EXT3), 14 (UOR-2-EXT3), or 16 (IR).

Notably, as used herein "k_c" is the minimum number of RoHC SN bits to be used for the current RoHC compressed packet. As discussed below, the value of k_c is a computed value. The actual "k" number of bits that will actually be used for encoding may be larger than k_c, depending on the RoHC packet type that is ultimately selected for the RoHC compressed packet. In contrast, "k_d," which is discussed below, is an actual number of bits in the RoHC SN for a received packet at the RoHC decompressor.

If the IP packet is associated to a PDCP Service Data Unit (SDU), the transmitting PDCP entity 28 performs integrity protection (for c-plane data only) and ciphering. The parameters that are required by PDCP for ciphering (and deciphering) are defined in 3GPP TS 33.401 Release 12 (Version 12.11.0), which is entitled "Technical Specification Group Services and System Aspects; 3GPP System Architecture Evolution (SAE); Security architecture." The parameters required by PDCP for ciphering include:

KEY: A 128-bit cipher key.
COUNT: HFN+PDCP SN.
BEARER: A radio bearer Identifier (ID).
DIRECTION: A direction of the radio bearer (i.e., uplink or downlink).
LENGTH: A length of a ciphering keystream to be generated by the ciphering algorithm.

As indicated above, the COUNT parameter is formed by combining the HFN and the PDCP SN. Note that the COUNT parameter is itself a SN used for ciphering/deciphering as well as integrity protection in the PDCP layer 26. A given SN (COUNT) is only to be used once for a given KEY on the same radio bearer in the same direction. The same SN (COUNT) can be used for both ciphering/deciphering and integrity protection. Again, the PDCP SN is a 5, 7, or 12 bit value assigned to a PDCP PDU, and PDCP PDUs transmitted from the transmitting PDCP entity 28 to the receiving PDCP entity 28 are assigned PDCP SNs in sequential order. The HFN is an overflow counter mechanism used in order to limit the actual number of PDCP SN bits that are needed to be sent over the air interface in the PDCP PDUs. The HFN needs to be synchronized between the transmitting PDCP entity 28 and the receiving PDCP entity 28. In other words, when the PDCP SN has reached its maximum value (which in turn depends on the number of bits used for PDCP SN (5, 7, or 12 bits)), the PDCP SN will be restarted from 0 and the HFN will be increased by one.

Ciphering is performed as follows. At the transmitting PDCP entity 28, the input parameters are input to a ciphering algorithm that then outputs a ciphering keystream. The packet to be transmitted by the transmitting PDCP entity 28 is then masked (e.g., XOR operation) by the ciphering keystream to provide a data part of a PDCP PDU that is transmitted to the receiving PDCP entity 28 after addition of a PDCP header. Importantly, the PDCP header includes the PDCP SN but does not include the PDCP HFN.

At the receiving PDCP entity 28, the PDCP SN is extracted from the header of the PDCP PDU and combined with a PDCP HFN maintained locally by the receiving PDCP entity 28 to provide the COUNT parameter for deciphering. The receiving PDCP entity 28 then passes the COUNT parameter along with the other parameters required by PDCP to the ciphering algorithm that then outputs a ciphering keystream. This ciphering keystream should be the same as that used by the transmitting PDCP entity 28. The receiving PDCP entity 28 then deciphers the PDCP PDU using the ciphering keystream to provide a deciphered PDCP PDU. For user plane data, the deciphered PDCP PDU may be an IP packet or a RoHC compressed IP packet.

For a RoHC compressed IP packet, the receiving PDCP entity 28, and in particular the RoHC decompressor 32 of the receiving PDCP entity 28, performs header decompression. In particular, the RoHC decompressor 32 extracts the W-LSB encoded RoHC SN from the RoHC compressed IP packet. The RoHC decompressor 32 decompresses, or decodes, the W-LSB encoded RoHC SN to obtain the full (or decompressed) RoHC SN. Then, using the full (i.e., decompressed) RoHC SN and the stored context of the RoHC decompressor 32, the RoHC decompressor 32 reconstructs the full IP/UDP/RTP headers to thereby provide a decompressed IP/UDP/RTP packet. The receiving PDCP entity 28 also performs delivery and duplicate detection in order (for u-plane data only).

One issue with current RoHC techniques is that they do not adequately protect against the loss of a large burst of packets. Specifically, RFC 3095, Section 5.3.2.2.4, entitled "Correction of SN LSB wraparound," describes a repairing mechanism for the RoHC SN after a decompression failure due to a burst of lost packets. This repair mechanism protects against loss of a burst of at most $2^{k\_d+1}$ packets. When using the most common RoHC packet type/header type, k_d is 4 and, as such, the repair mechanism protects against a loss of a burst of at most 32 packets. However, a loss of a burst of more than 32 packets is a very real possibility, particularly in the cellular network 10 when the wireless device 14 operates near the edge of the cell served by the base station 12. When the RoHC SN cannot be repaired, the RoHC compressor 30 and the RoHC decompressor 32 must typically perform a recovery procedure that is costly in terms of, e.g., extra signaling, delay, and wasted radio link bandwidth, and may result in a poor user experience.

In some embodiments, the present disclosure relates to systems and methods for adapting the configuration of the RoHC compressor 30 of the transmitting PDCP entity 28 based on, or as a function of, a quality of the transmit channel. Specifically, as discussed below, in some embodiments, the value of k_c is increased as the quality of the channel decreases. By increasing the value of k_c, the RoHC decompressor 32 is able to successfully decode the RoHC SN for larger bursts of lost packets. Further, increasing the value of k_c results in less aggressive RoHC compression, which in turn decreases the likelihood of context desynchronization.

In particular, RoHC defines various RoHC header types that use k_c values of different sizes. Specifically, as stated above, in the current standard, the value of k_c may be 4 (for UO-0 and UO-1-TS), 6 (UOR-2), 7 (UO1-ID-EXT0 and UO1-ID-EXT1), 9 (UOR-2-EXT0 and UOR-2-EXT1), 12 (UO1-ID-EXT3), 14 (UOR-2-EXT3), or 16 (IR). However, the present disclosure is not limited to these particular values of k_c or these particular modes. The size of k_c represents a trade-off between compression efficiency and protection of bursts of lost packets. Choosing an aggressive, or smaller, value for k_c provides greater compression efficiency, but offers less protection against bursts of lost packets. A small value of k_c may be desired when the quality of the transmit channel (and thus the transmit radio link) is good. Conversely, choosing a conservative, or larger, value for k_c provides less compression efficiency but offers greater protection against bursts of lost packets. In other words, increasing the value of k_c increases the maximum number of packets in a burst of lost packets for which the RoHC SN can be repaired using the repair mechanism defined in RFC 3095. In addition, as stated above, increasing the value of k_c also decreases the likelihood of context desynchronization due to pattern changes during a burst of lost packets.

Figure 4:
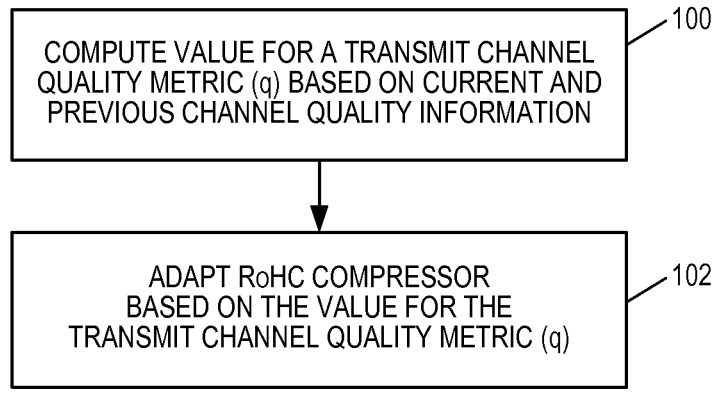
FIG. 4 is a flow chart that illustrates a process for adaptively configuring a Robust Header Compression (RoHC) compressor based on a transmit channel quality metric according to one embodiment of the present disclosure.

In this regard, FIG. 4 illustrates a process for adapting the RoHC compressor 30 according to one embodiment of the present disclosure. As illustrated, a value for a channel quality metric (q) for the transmit channel between the transmitting radio node 16 (e.g., the wireless device 14) and the receiving radio node 16 (e.g., the base station 12) is computed (step 100). In general, the channel quality metric (q) is any metric that is indicative of the quality of the transmit channel. In some embodiments, the channel quality metric (q) is a moving average of channel quality information values for the transmit channel (e.g., number of complete Hybrid ARQ (HARQ) failures versus number of HARQ successes or number of HARQ attempts, Signal-to-Noise Ratio (SNR) values, Reference Signal Received Power (RSRP) values, Reference Signal Received Quality (RSRQ) values, Channel Quality Indictor (CQI) values, Block Error Rate (BLER) values, or the like). Still further, in some embodiments, the channel quality metric (q) is a moving, weighted average of channel quality information values that gives greater weight to the most recent channel quality information value(s). As discussed below, the value for the channel quality metric (q) is, in some embodiments, computed by a layer in the protocol stack 18 of the radio node 16 below the PDCP layer 26 (e.g., the PHY layer 20, the MAC layer 22, or the RLC layer 24) and made available to the PDCP layer 26 and, in particular, the RoHC compressor 30 via, for example, an Application Programming Interface (API).

The PDCP layer 26, and in particular the RoHC compressor 30, adapts the RoHC compressor 30 based on the value computed for the channel quality metric (q) (step 102). In one embodiment, the RoHC compressor 30 adapts the value of k_c (i.e., the number of Least Significant Bits (LSBs) of the RoHC SN included in the compressed RoHC SN) based on the value computed for the channel quality metric (q) such that the value of k_c is inversely related to quality of the transmit channel, as indicated by the value of the channel quality metric (q) (i.e., the value of k_c increases as the transit channel quality decreases, as indicated by the value of the channel quality metric (q), and vice versa). As discussed below, the value of k_c is then used to select the RoHC header, or packet, type. In another embodiment, the RoHC compressor 30 adapts the RoHC header type, and thus the value of k_c, based on the value of the channel quality metric (q). By adapting the RoHC compressor 30 based on the value of the channel quality metric (q), the value of k_c and thus the RoHC header type is intelligently selected to increase the probability of successful decompression by the RoHC decompressor 32 of the receiving PDCP entity 28. In other words, the probability of the loss of a burst of more than $2^{k\_c+1}$ packets is decreased. The adaptation of the RoHC compressor 30, or more specifically the level of compression of the RoHC compressor 30, is performed independently from the operation of the RoHC decompressor 32 of the receiving PDCP entity 28 and does not require any over-the-air signaling overhead.

In one embodiment, during operation, the RoHC compressor 30 of the transmitting PDCP entity 28 and the RoHC decompressor 32 of the receiving PDCP entity 28 operate in O-MODE in all radio conditions, as per the RoHC standard. If the quality of the transmit channel is good (i.e., the value of the channel quality metric (q) is better than a threshold), the highest compression state is reached in steady stand with the RoHC header that is selected as being the smallest possible RoHC header (i.e., the mostly highly compressed RoHC header), which is usually the UO-0 header type, unless a change in pattern needs to be communicated from the RoHC compressor 30 or the RoHC decompressor 32. When the quality of the transmit channel degrades to the point where a burst of lost packets is deemed to be likely (i.e., the value of the channel quality metric (q) is worse than a threshold), then the RoHC compressor 30 is adapted to choose a RoHC packet type that contains a larger value for k_c and, in some embodiments, other fields that may experience a pattern change during a burst of lost packets.

Figure 5:
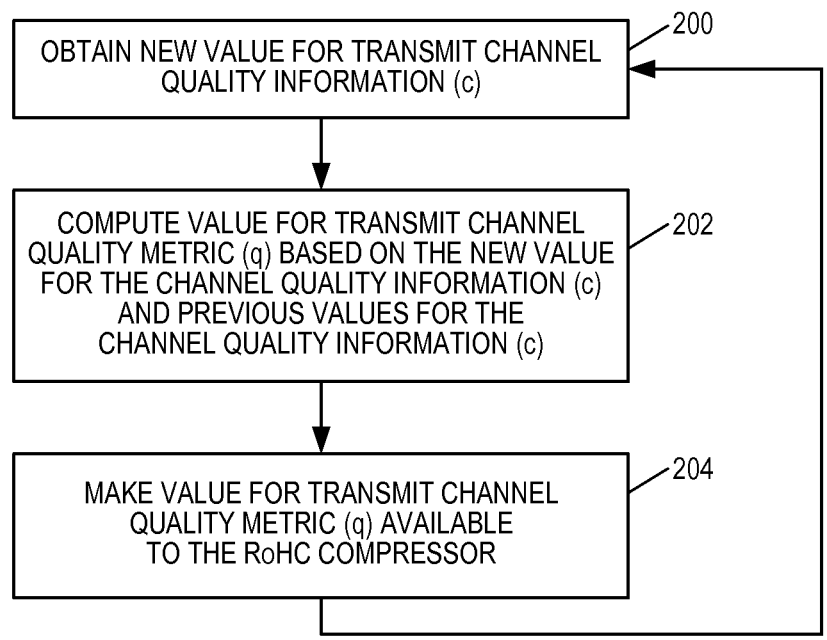
FIG. 5 is a flow chart that illustrates a process for computing a transmit channel quality metric according to one embodiment of the present disclosure.

FIG. 5 illustrates a process for computing the value for the channel quality metric (q) and making the value of the channel quality metric (q) available to the RoHC compressor 30 according to one embodiment of the present disclosure. First, a new value for channel quality information (c) is obtained (step 200). In one embodiment, the MAC layer 22 is adapted to obtain the new value for the channel quality information (c). As discussed above, the channel quality information (c) may be any type of channel quality information for the transmit channel. In one embodiment, the channel quality information (c) is a number of complete HARQ failures versus HARQ successes or complete HARQ attempts, SNR, RSRP, RSRQ, CQI, BLER, or the like.

Next, a new value for the channel quality metric (q) is computed based on the new value for the channel quality information (c) and one or more previous values for the channel quality information (c), if any (step 202). The channel quality metric (q) is indicative of an instantaneous channel quality of the transmit channel. In one embodiment, the new value for channel quality metric (q) is a moving, weighted average of the new value for the channel quality information (c) and the one or more previous values for the channel quality information (c), where the most recent values for the channel quality information (c) are weighted more heavily than older values for the channel quality information (c). In one example embodiment, the channel quality metric (q) is an exponentially weighted moving average (i.e., a type of moving average that is similar to a simple moving average, except that more weight is given to the latest data) of complete HARQ failures (i.e., maxHarqTX reached without success). In general, the new value for the channel quality metric (q) represents a probability, or likelihood, of failure or loss of the next transmitted RoHC compressed packet. Specifically, a higher value (or better value) of the channel quality metric (q) represents a high channel quality and thus a lower probability or likelihood of loss of the next transmitted RoHC compressed packet, and a lower value (or worse value) of the channel quality metric (q) represents lower channel quality and thus a higher probability or likelihood of loss of the next transmitted RoHC compressed packet.

Lastly, the new value of the channel quality metric (q) is made available to the RoHC compressor 30 (step 204). In one embodiment, the MAC layer 22 computes the new value for the channel quality metric (q) and makes the new value for the channel quality metric (q) available to the RoHC compressor 30 via, for example, an API. However, this is just one example. The present disclosure is not limited thereto. The process then returns to step 200 and is repeated. In this manner, the value for the channel quality metric (q) is updated over time to reflect changing channel conditions. Notably, if the transmitting PDCP entity 28 is at the base station 12, a separate value for the channel quality metric (q) for the transmit channel may be maintained for each wireless device 14 for which RoHC is enabled.

Figure 6:
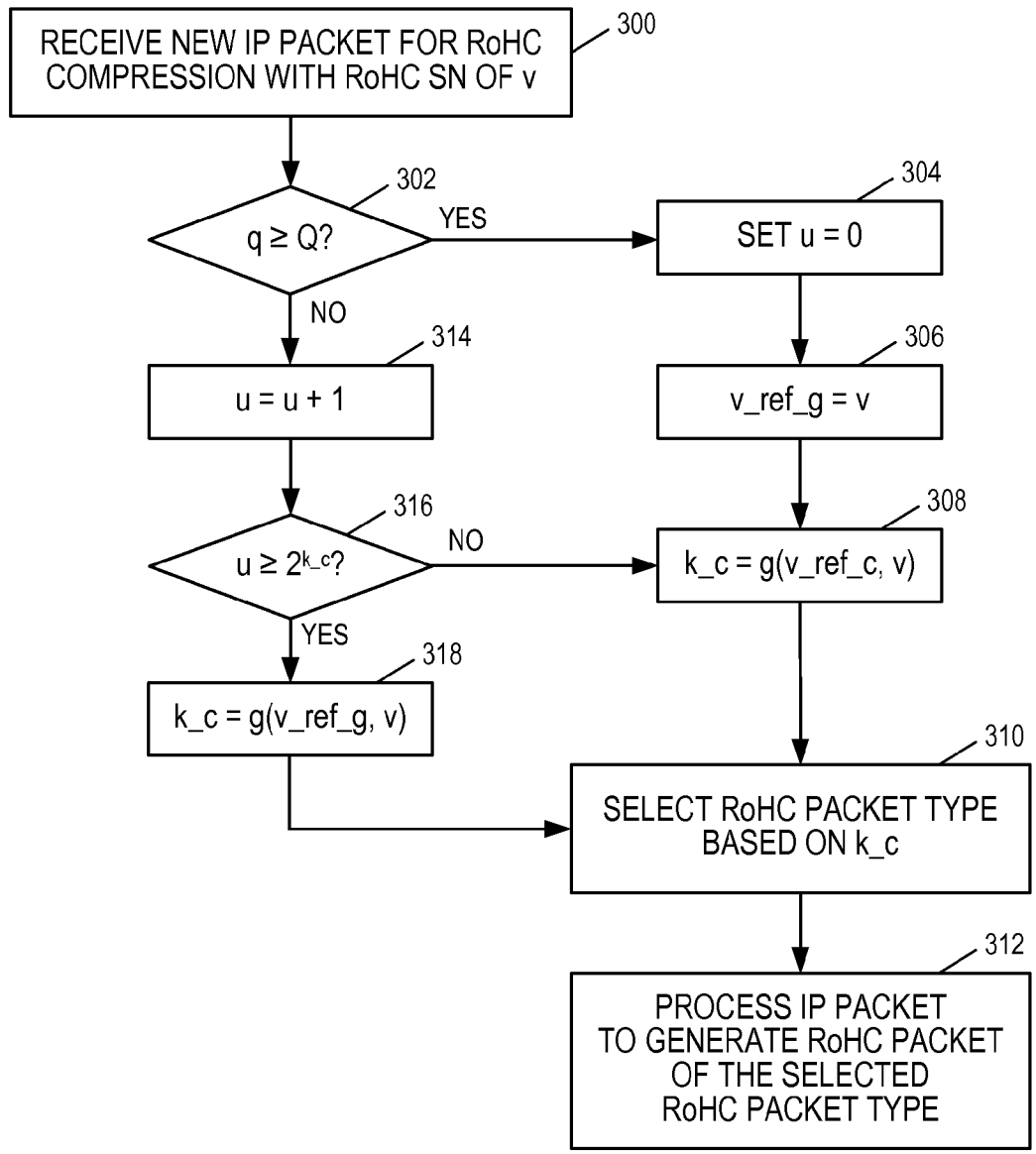
FIG. 6 is a flow chart that illustrates a more detailed process for adaptively configuring a RoHC compressor based on a transmit channel quality metric according to one embodiment of the present disclosure.

Once the new value of the channel quality metric (q) is made available to the RoHC compressor 30, the RoHC compressor 30 utilizes the new value of the channel quality metric (q) to adapt the RoHC. In this regard, FIG. 6 illustrates the operation of the RoHC compressor 30 to adapt RoHC based on the value of the channel quality metric (q) computed based on the channel quality information (c) as, for example, described above with respect to FIG. 5. As illustrated, the RoHC compressor 30 receives a new IP packet for RoHC compression (step 300). The RoHC SN for the new IP packet is a value (v). If the new IP packet contains a SN that is encoded in RoHC and used as the basis for the RoHC SN, then this value is v. Typically, for RoHC Profile 1, the RTP SN is used as the basis for the RoHC SN. If the IP packet type is an IP packet type that does not have a well-formed SN (e.g., Profile 2 UDP packet types), then the RoHC compressor 30 generates a 16-bit RoHC SN that increase by 1 for each IP packet received in the stream for RoHC compression.

The RoHC compressor 30 obtains the current value of the channel quality metric (q) for the transmit channel, and determines whether the value of the channel quality metric (q) is greater than or equal to a quality threshold (Q) (step 302). Note that, in this example, a value of q that is greater than or equal to Q is indicative of the channel quality being better than the quality threshold (Q). However, for some types of channel quality metrics (q), a value of q that is less than or equal to the quality threshold (Q) may be indicative of a channel quality that is better than the quality threshold (Q). Thus, it should be understood that the comparison in step 302 is more generally a comparison of whether the quality of the transmit channel is better than the quality threshold (Q). The quality threshold (Q) may be statically configured, e.g., during design or manufacturing. In this embodiment, the quality threshold (Q) is configured such that, if the value of the channel quality metric (q) is greater than or equal to the quality threshold (Q), then the RoHC compressed packet for the new IP packet is predicted to be successfully received (i.e., decompressed) by the RoHC decompressor 32 of the receiving PDCP entity 28. Otherwise, if the value of the channel quality metric (q) is less than the quality threshold (Q), then the RoHC compressed packet for the new IP packet is predicted to be lost (i.e., not successfully received by the RoHC decompressor 32 of the receiving PDCP entity 28).

If the value of the channel quality metric (q) is greater than or equal to the quality threshold (Q) (i.e., the channel quality is better than the quality threshold (Q)), then a lost packet counter (u) is set to 0 (step 304). The lost packet counter (u) is a counter for the number of RoHC compressed packets transmitted in a row that are predicted to have been lost. The RoHC compressor 30 also sets a reference RoHC SN value (v_ref_g) to the RoHC SN (v) for the new IP packet (step 306). The reference RoHC SN value (v_ref_g) is a reference RoHC SN value that is indicative of a start of a burst or gap of lost RoHC compressed packets. The RoHC compressor 30 then operates in the conventional manner by computing a value for k_c as g(v_ref_c, v) (step 308). The function g() is defined in RFC 3095, Section 4.5.1, as the function that returns the minimum value of k_c such that v falls into the interval f(v_ref_c, k), where f(v_ref_c, k) is referred to as an interpretation interval for RoHC compression and is defined as f(v_ref_c, k)=[v_ref_c−p, v_ref_c+ $(2^{k\_c-1})$−p], where p is an integer. Further, v_ref_c is a reference RoHC SN value defined by RFC 3095, Section 4.5.1, as the last RoHC SN that has been compressed by the RoHC compressor 30. When only a few distinct values of k_c are possible, the RoHC compressor 30 will instead pick the smallest k_c that puts v in the interval f(v_ref_c, k_c). This may occur, for example, due to limitations imposed by packet formats, as described in RFC 3095, Section 5.7.

Once the value for k_c is computed, the RoHC compressor 30 proceeds in the conventional manner. Specifically, the RoHC compressor 30 selects the RoHC packet type (i.e., the RoHC header type) based on the value computed for k_c (step 310). In one embodiment, the algorithm or process for selecting the RoHC packet type based on the value computed for k_c is the same as that defined in the RoHC standard. More specifically, the RoHC packet type that is selected is the RoHC packet type that has the capability of transmitting at least k_c bits of the RoHC SN. However, variables other than the value of k_c are also considered when selecting the RoHC packet type. For example, if other fields in the packet changed from the previous packet, those changes should be communicated and, therefore, this might influence RoHC packet type selection. The RoHC compressor 30 then processes IP packet to generate a RoHC compressed packet of the selected RoHC packet type (step 312).

Returning to step 302, if the value of the channel quality metric (q) is less than the quality threshold (Q) (i.e., the channel quality is worse than the quality threshold (Q)), the RoHC compressor 30 increments the lost packet counter (u) because the RoHC compressed packet for the new IP packet is predicted to be lost (step 314). The RoHC compressor 30 determines whether the lost packet counter (u) is greater than a lost packet threshold, which in this example is $2^{k\_c}$ (i.e., the current W-LSB encoded RoHC SN window space) (step 316). For step 316, the value of k_c is the last determined value for k_c for transmitting the W-LSB encoded RoHC SN. If the lost packet counter (u) is less than the lost packet threshold, the RoHC compressor 30 proceeds to step 308 and continues in the conventional manner.

If the lost packet counter (u) is greater than or equal to the lost packet threshold, then the current value of k_c is likely not large enough. Specifically, if the lost packet threshold is $2^{k\_c}$ and u≥$2^{k\_c}$ for the current value of k_c, then the current value of k_c is likely not large enough considering the number of consecutive packets predicted to have been lost. As such, the RoHC compressor 30 computes a new value for k_c as k_c=g(v_ref_g, v), where v_ref_g is the reference RoHC SN for the last RoHC compressed packet that was transmitted and predicted to be successfully received by the RoHC decompressor 32 of the receiving PDCP entity 28 (step 318). By computing the value of k_c based on v_ref_g rather than v_ref_c, the RoHC compressor 30 increases the value of k_c as compared to the value of k_c that would have been computed using the conventional technique (i.e., k_c=g (v_ref_c, v)).

Once k_c is computed in step 318, the RoHC compressor 30 proceeds in the conventional manner. Specifically, the RoHC compressor 30 selects the RoHC packet type (i.e., the RoHC header type) based on the value computed for k_c (step 310). The RoHC compressor 30 then processes the IP packet to generate a RoHC compressed packet of the selected RoHC packet type (step 312). Importantly, by computing k_c based on the RoHC SN of the last RoHC compressed packet predicted to have been successfully received by the RoHC decompressor 32 of the receiving PDCP entity 28, the value of k_c increases and, as a result, a less aggressive RoHC packet type is selected in step 310. This less aggressive packet type provides improved protection against a burst of lost packets (due to increased value of k_c) and may also include fields that may experience pattern changes during the burst of lost packets. As a result, when the channel quality improves after a burst of lost packets, the next transmitted/received RoHC compressed packet will include a W-LSB encoded RoHC SN having a sufficient number of bits (k_c) substantially increases the likelihood that the RoHC decompressor 32 will be able to successfully decode the W-LSB encoded RoHC SN. In addition, by using a less aggressive RoHC packet type, fields that may have experienced a pattern change during the burst of lost packets are more likely to be included in the RoHC compressed packet. As a result, the RoHC decompressor 32 is substantially more likely to be able to successfully decompress the first received RoHC compressed packet after a burst of lost packets and, therefore, can avoid the costly recovery mechanism required when context desynchronization occurs between the RoHC compressor 30 of the transmitting PDCP entity 28 and the RoHC decompressor 32 of the receiving PDCP entity 28.

Figure 7:
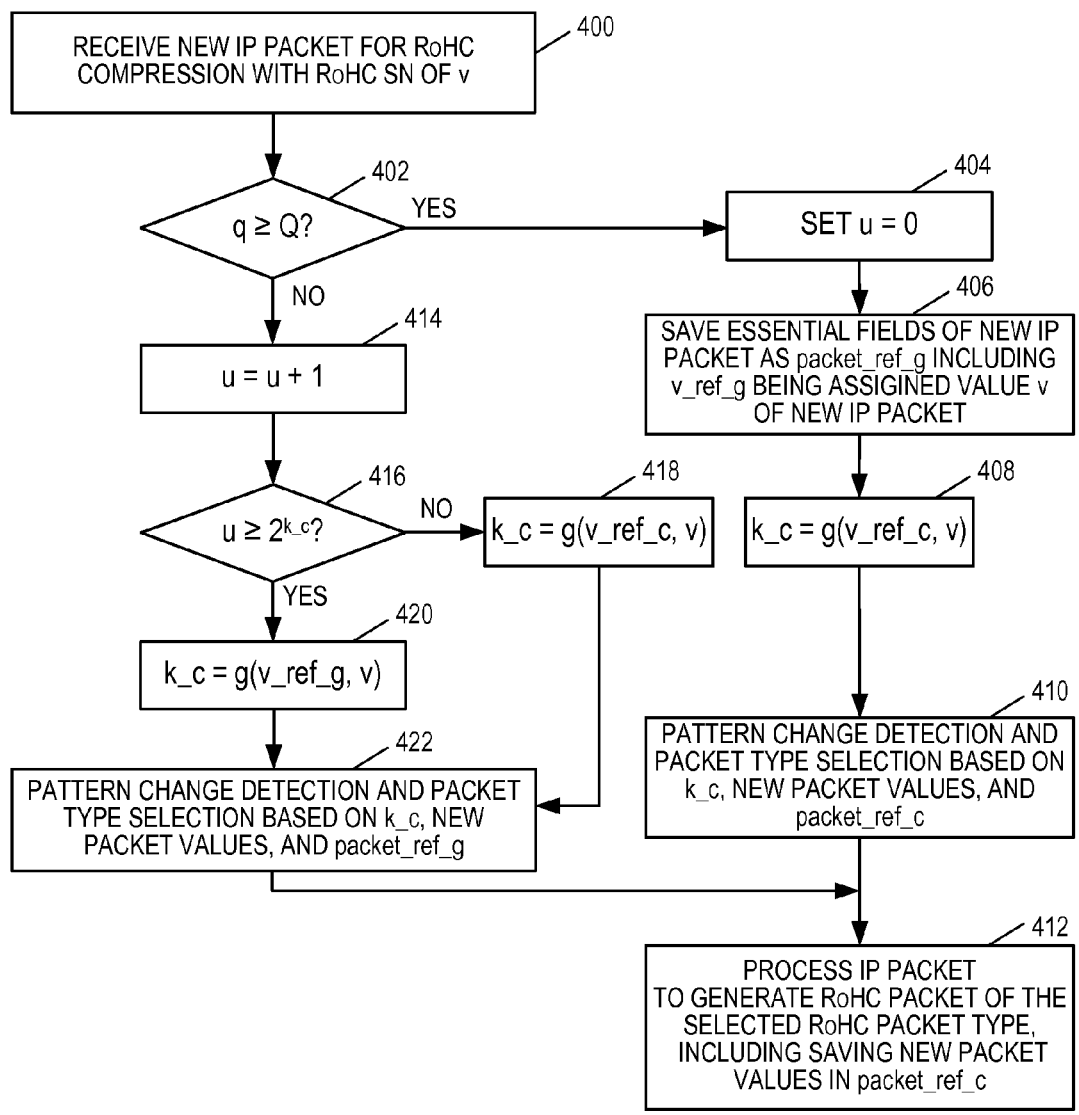
FIG. 7 is a flow chart that illustrates the operation of the RoHC compressor to adapt RoHC based on the value of the channel quality metric (q) according to another embodiment of the present disclosure.

FIG. 7 illustrates the operation of the RoHC compressor 30 to adapt RoHC based on the value of the channel quality metric (q) according to another embodiment of the present disclosure. Again, in this embodiment, the channel quality metric (q) may be computed based on the channel quality information (c) as, for example, described above with respect to FIG. 5. As illustrated, the RoHC compressor 30 receives a new IP packet for RoHC compression (step 400). The RoHC SN for the new IP packet is a value (v). If the new IP packet contains a SN that is encoded in RoHC and used as the basis for the RoHC SN, then this value is v. Typically, for RoHC Profile 1, the RTP SN is used as the basis for the RoHC SN. If the IP packet type is an IP packet type that does not have a well-formed SN (e.g., Profile 2 UDP packet types), then the RoHC compressor 30 generates a 16-bit RoHC SN that increases by 1 for each IP packet received in the stream for RoHC compression.

The RoHC compressor 30 obtains the current value of the channel quality metric (q) for the transmit channel, and determines whether the value of the channel quality metric (q) is greater than or equal to a quality threshold (Q) (step 402). Note that, in this example, a value of q that is greater than or equal to Q is indicative of the channel quality being better than the quality threshold (Q). However, for some types of channel quality metrics (q), a value of q that is less than or equal to the quality threshold (Q) may be indicative of a channel quality that is better than the quality threshold (Q). Thus, it should be understood that the comparison in step 402 is more generally a comparison of whether the quality of the transmit channel is better than the quality threshold (Q). The quality threshold (Q) may be statically configured, e.g., during design or manufacturing. In this embodiment, the quality threshold (Q) is configured such that, if the value of the channel quality metric (q) is greater than or equal to the quality threshold (Q), then the RoHC compressed packet for the new IP packet is predicted to be successfully received (i.e., decompressed) by the RoHC decompressor 32 of the receiving PDCP entity 28. Otherwise, if the value of the channel quality metric (q) is less than the quality threshold (Q), then the RoHC compressed packet for the new IP packet is predicted to be lost (i.e., not successfully received by the RoHC decompressor 32 of the receiving PDCP entity 28).

If the value of the channel quality metric (q) is greater than or equal to the quality threshold (Q) (i.e., the channel quality is better than the quality threshold (Q)), then a lost packet counter (u) is set to 0 (step 404). The lost packet counter (u) is a counter for the number of RoHC compressed packets transmitted in a row that are predicted to have been lost. The RoHC compressor 30 also saves, or stores, essential fields of the new IP packets as packet_ref_g, including v_ref_g being set to the value of the RoHC SN (v) of the new IP packet (step 406). This effectively saves the last packet before the next gap occurs, or at least the values of the essential fields for the last packet before the next gap occurs. The essential fields are fields that are likely to change during a burst, or gap, of lost packets such as, for example, RTP timestamp or IP-ID field of an IPv4 header. Note, however, that the essential fields may be configurable by, e.g., the operator of the network, based on, e.g., the particularities of the deployment and empirical observations. The parameter packet_ref_g is therefore a packet that stores the last successfully compressed/sent packet (or at least the values of the essential fields from last successfully compressed/sent packet) before the gap, or burst, of lost packets is likely to have begun.

The RoHC compressor 30 then operates in the conventional manner by computing a value for k_c as g(v_ref_c, v) (step 408). The function g() is defined in RFC 3095, Section 4.5.1, as the function that returns the minimum value of k_c such that v falls into the interval f(v_ref_c, k_c), where f(v_ref_c, k_c) is referred to as an interpretation interval for RoHC compression and is defined as f(v_ref_c, k_c)= [v_ref_c−p, v_ref_c+($2^{k\_c-1}$)−p], where p is an integer. Further, v_ref_c is a reference RoHC SN value defined by RFC 3095, Section 4.5.1, as the last RoHC SN that has been compressed by the RoHC compressor 30. When only a few distinct values of k_c are possible, the RoHC compressor 30 will instead pick the smallest k_c that puts v in the interval f(v_ref_c, k_c). This may occur, for example, due to limitations imposed by packet formats, as described in RFC 3095, Section 5.7.

Once the value for k_c is computed, the RoHC compressor 30 proceeds in the conventional manner. Specifically, the RoHC compressor 30 performs pattern change detection and RoHC packet type selection based on the value for k_c, the values of the fields in the header(s) of the new IP packet, and packet_ref_c (step 410). The parameter "packet_ref_c" is the last successfully sent packet, or at least values of the essential fields of the last successfully sent packet. In one embodiment, the algorithm or process for selecting the RoHC packet type based on the value computed for k_c is the same as that defined in the RoHC standard. More specifically, the RoHC packet type that is selected is the RoHC packet type that has the capability of transmitting at least k_c bits of the RoHC SN. However, variables other than the value of k_c are also considered when selecting the RoHC packet type. For example, if other fields in the packet changed from the previous packet, those changes should be communicated and, therefore, this might influence RoHC packet type selection. The RoHC compressor 30 then processes IP packet to generate a RoHC compressed packet of the selected RoHC packet type (step 412).

Returning to step 402, if the value of the channel quality metric (q) is less than the quality threshold (Q) (i.e., the channel quality is worse than the quality threshold (Q)), the RoHC compressor 30 increments the lost packet counter (u) because the RoHC compressed packet for the new IP packet is predicted to be lost (step 414). The RoHC compressor 30 determines whether the lost packet counter (u) is greater than a lost packet threshold, which in this example is $2^{k\_c}$ (i.e., the current W-LSB encoded RoHC SN window space) (step 416). For step 416, the value of k_c is the last determined value for k_c for transmitting the W-LSB encoded RoHC SN.

If the lost packet counter (u) is less than the lost packet threshold, the RoHC compressor 30 operates in the conventional manner by computing a value for k_c as g(v_ref_c, v), as discussed above with respect to step 408 (step 418). Conversely, if the lost packet counter (u) is greater than or equal to the lost packet threshold, then the current value of k_c is likely not large enough. Specifically, if the lost packet threshold is $2^{k\_c}$ and u≥$2^{k\_c}$ for the current value of k_c, then the current value of k_c is likely not large enough considering the number of consecutive packets predicted to have been lost. As such, the RoHC compressor 30 computes a new value for k_c as k_c=g(v_ref_g, v), where v_ref_g is the reference RoHC SN for the last RoHC compressed packet that was transmitted and predicted to be successfully received by the RoHC decompressor 32 of the receiving PDCP entity 28 (step 420). By computing the value of k_c based on v_ref_g rather than v_ref_c, the RoHC compressor 30 increases the value of k_c as compared to the value of k_c that would have been computed using the conventional technique (i.e., k_c=g(v_ref_c, v)).

Once k_c is computed in step 418 or 420, the RoHC compressor 30 performs pattern change detection and RoHC packet type selection based on the value computed for k_c, the values of the fields in the header(s) of the new IP packet, and packet_ref_g (rather than packet_ref_c) (step 422). Again, the parameter packet_ref_c stores the last successfully compressed/sent packet, or at least values for essential fields of a last successfully compressed/sent packet. In contrast, packet_ref_g stores value for fields of a last successfully compressed packet before the gap, or burst, of lost packets started. The standard RoHC packet type selection algorithm analyzes for pattern change differences between the last successfully sent compressed packet and the new packet. Where the standard RoHC packet type selection algorithm analyzes for pattern change differences between the packet_ref_c and the new packet, step 422 uses the same algorithm to analyze for pattern change differences between packet_ref_g and the new packet. If any pattern changes should be communicated to the RoHC compressor 30 via fields of the RoHC packet, the RoHC compressor 30 selects a RoHC packet type that contains those fields. This insures that, if the RoHC decompressor 32 does receive the packet, it will have the information needed for successful decompression.

By using packet_ref_g instead of packet_ref_c, any pattern changes from the time that the gap, or burst, of lost packets likely started until the time of compression and transmission of this new IP packet that need to be communicated to the RoHC decompressor 32 will be handled by using packet_ref_g for RoHC packet type selection. In particular, the RoHC packet type selected is a RoHC packet type that includes all of the fields that need to be explicitly communicated to the RoHC decompressor 32. Note that, for dynamically changing fields, the RoHC compressor 30 communicates the pattern of how the fields change relative to the RoHC SN. If for a new IP packet the pattern relative to the RoHC SN changes, this change in pattern will be communicated to the RoHC decompressor 32. In this manner, RoHC packet type selection is adapted to keep transmitting pattern changes that occur during the gap, or burst, of lost packets (e.g., while the channel faded). This allows the RoHC decompressor 32 to receive the correct value not only for the RoHC SN, but also for other fields (e.g., RTP time stamp) that are correlated with the RoHC SN most of the time but experience a change in correlation (e.g., when transitioning from Silence Insertion Descriptor (SID) to TALK to SID during a voice call).

The RoHC compressor 30 then processes the IP packet to generate a RoHC compressed packet of the selected RoHC packet type, as discussed above (step 412). Processing of the IP packet includes saving the essential values of the fields in the header(s) of the IP packet as packet_ref_c.

Embodiments of a proactive adaptation scheme for the RoHC compressor 30 are described above. These proactive adaptation schemes adapt the value of k_c and thus the RoHC packet type based on the channel quality of the transmit channel. In doing so, the likelihood of context desynchronization between the RoHC compressor 30 of the transmitting PDCP entity 28 and the RoHC decompressor 32 of the receiving PDCP entity 28 is substantially reduced, which in turn results in a lower probability of end-user traffic interruption. This is especially important for applications such as Voice over LTE (VoLTE), where fast recovery after fading is critical to the end-user quality of experience.

The importance of maintaining context synchronization between the RoHC compressor 30 of the transmitting PDCP entity 28 and the RoHC decompressor 32 of the receiving PDCP entity 28 is augmented by the fact that transmitting the same amount of data requires more physical resource elements when operating at a cell edge due to reduced modulation and encoding efficiency. Falling back to the RoHC Initialization and Refresh (IR) state because of a loss of context synchronization effectively doubles the amount of VoLTE data, thereby reducing the effective capacity of the cell. Thus, by reducing the likelihood of context desynchronization, the proactive adaptation schemes increase the effective capacity of the cell.

Further, when operating near the cell capacity, it is possible that some VoLTE UEs transitioning to the IR state may never be able to regain their media channel and the call would be dropped. In consequence, the disclosed proactive adaptation schemes will increase retainability as well as the quality of experience of the end users.

The proactive adaptation schemes also dramatically reduce the need for the signaling intensive, reactive (slow) Acknowledgement (ACK)/Negative Acknowledgement (NACK) recovery mechanism provided by the RoHC standard. In other words, the proactive adaptation schemes reducing the need of cooperation between the RoHC compressor 30 of the transmitting PDCP entity 28 and the RoHC decompressor 32 of the receiving PDCP entity 28 to resolve a context desynchronization. There are already mechanisms to measure the channel quality at lower layers that are built into the LTE standard (e.g., HARQ, CQI reports, BLER measurement, etc.) that can be used to predict the likelihood that a packet loss will occur and focus on prevention rather than recovery.

When adapting and sending a more conservative RoHC header type/RoHC packet type, an additional benefit is that other fields of the original header are also included (e.g., the RTP timestamp). Typically, if a pattern change occurs in those fields, the pattern change would be communicated from the RoHC compressor 30 of the transmitting PDCP entity 28 and the RoHC decompressor 32 of the receiving PDCP entity 28 very few times or only once, after which the RoHC compressor 30 would send a higher compressed packet. If the pattern change information is lost in a burst of lost packets, the correct reconstruction of the field will fail even if the RoHC SN is correctly reconstructed. In contrast, with the adaptive schemes described herein, since the fields most likely to experience a pattern change are included in the more conservative RoHC header types/RoHC packet types selected under poor channel quality conditions when using one of the adaptive schemes, the RoHC decompressor 32 will, with much greater likelihood, be able to correctly reconstruct both RoHC SN and the fields that experienced a pattern change during the burst of lost packets. When the conditions change such that the adaptive implementation is no longer necessary, the standard RoHC algorithm may be used.

Another benefit of adapting the RoHC compressor 30 is that by selecting a RoHC header type that contains a Cyclic Redundancy Check (CRC) encoded with a higher number of bits, the probability of CRC collision is much lower, leading to more protection against incorrectly updating the RoHC decompressor 32 context due to a CRC collision. Notably, while exemplary advantages and benefits of the proactive RoHC adaptation schemes are described above, these examples are non-limiting.

Thus far, the description has focused on embodiments of an adaptation scheme for the RoHC compressor 30 that reduce the likelihood of RoHC context desynchronization. The discussion will now turn to systems and methods for determining and utilizing a PDCP SN gap value during RoHC SN decoding to enabling repairing of the RoHC SN after a loss of a large burst of packets (i.e., loss of a burst of more than $2^{k\_d}$ packets). Typically, the PDCP SN has more bits (e.g., 7 or 12 bits) than the W-LSB encoded RoHC SN (e.g., 4 bits). Therefore, the size of a gap, or burst, of lost packets can be tracked in the PDCP layer 26 by the receiving PDCP entity 28 and used by the RoHC decompressor 32 to decode the W-LSB encoded RoHC SN of a received PDCP PDU, particularly when the number of lost packets in the burst is greater than the window size of the W-LSB encoded RoHC SN (i.e., when there is a burst of more than $2^{k\_d}$ lost packets).

Figure 8:
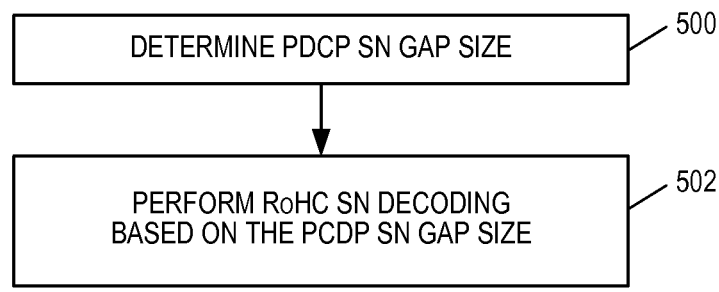
FIG. 8 illustrates a process for performing RoHC Sequence Number (SN) decoding based on a size of a PDCP SN gap according to one embodiment of the present disclosure.

In this regard, FIG. 8 is a flow chart that illustrates the operation of the receiving PDCP entity 28 and the RoHC decompressor 32 according to one embodiment of the present disclosure. First, the receiving PDCP entity 28 determines a value, or size, of a PDCP gap (g) (step 500). The size of the PDCP gap is determined by the receiving PDCP entity 28 using standard, or conventional, information available to the receiving PDCP entity 28 (e.g., COUNT values). In particular, the receiving PDCP entity 28 determines when there is a gap in the PDCP SN, which indicates packet loss between the transmitting PDCP entity 28 and the receiving PDCP entity 28. In one embodiment, the size of the PDCP gap (g) is computed based on the COUNT value of the previous PDCP PDU received by the receiving PDCP entity 28 and the COUNT value of the current PDCP PDU received by the receiving PDCP entity 28. The size of this PDCP gap can then be passed to, or otherwise made available to, the RoHC decompressor 32 of the receiving PDCP entity 28.

The RoHC decompressor 32 performs decoding, or decompression, of the W-LSB encoded RoHC SN in the current PDCP PDU based on the size of the PDCP gap (g) (step 502). In general, if the size of the PDCP gap (g) is greater than a threshold PDCP gap size, the size of the PDCP gap (g) is applied to a reference (full or uncompressed) RoHC SN corresponding to the last successfully received and decompressed RoHC packet. The modified reference RoHC SN is then used to decode the W-LSB encoded RoHC SN. The threshold PDCP gap size is such that successful decoding of the W-LSB encoded RoHC SN is unlikely if the size of the PDCP gap (g) is greater than the threshold PDCP gap size. Otherwise, if the size of the PDCP gap (g) is not greater than a threshold PDCP gap size, the W-LSB encoded RoHC SN is decoded using conventional RoHC processing as defined in the RoHC standard.

Figure 9:
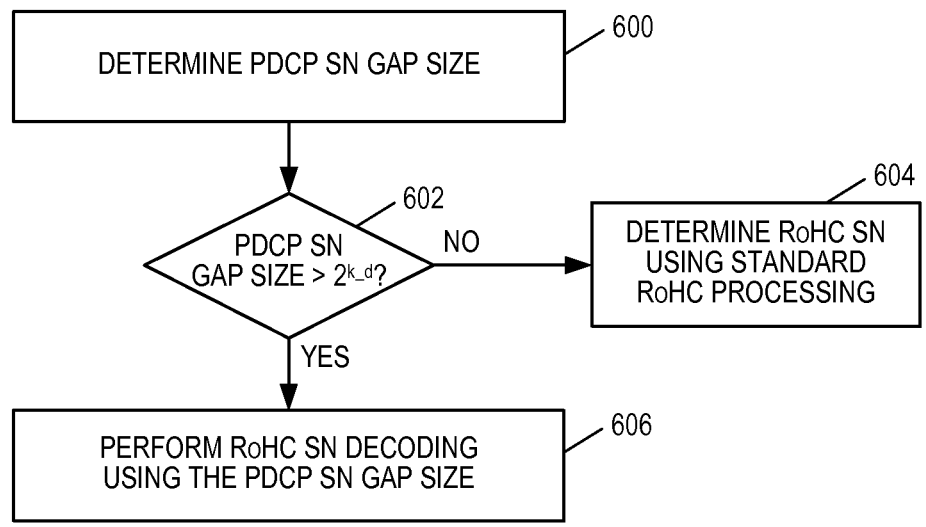
FIG. 9 illustrates a process for performing RoHC SN decoding based on a size of a PDCP SN gap according to one embodiment of the present disclosure.

FIG. 9 is a flow chart that illustrates the operation of the receiving PDCP entity 28 and the RoHC decompressor 32 according to another embodiment of the present disclosure. First, the receiving PDCP entity 28 determines a value, or size, of a PDCP gap (g), as discussed above (step 600). In this embodiment, the RoHC decompressor 32 of the receiving PDCP entity 28 determines whether the size of the PDCP gap (g) is greater than $2^{k\_d}$ for the current value of k_d for the W-LSB encoded RoHC SN (step 602). If not, the W-LSB encoded RoHC SN is decoded using conventional RoHC processing as defined in the RoHC standard (step 604). However, if the size of the PDCP gap (g) is greater than $2^{k\_d}$ for the current value of k_d, then the RoHC decompressor 32 performs RoHC decoding, or decompression, of the W-LSB encoded RoHC SN in the current PDCP PDU using the size of the PDCP gap (g) (step 606). More specifically, in one embodiment, the size of the PDCP gap (g) is applied to a reference (full or uncompressed) RoHC SN corresponding to the last successfully received and decompressed RoHC packet. The modified reference RoHC SN is then used to decode the W-LSB encoded RoHC SN.

Figure 10:
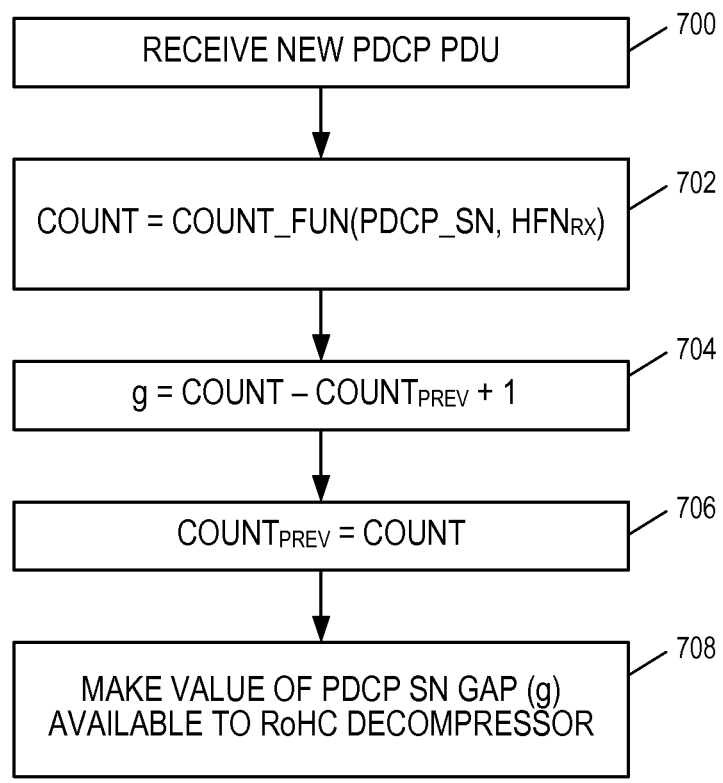
FIG. 10 illustrates a process for computing the size of a PDCP SN gap according to one embodiment of the present disclosure.

FIG. 10 is a flow chart that illustrates the operation of the receiving PDCP entity 28 to determine the size of the PDCP gap (g) and make the size of the PDCP gap (g) available to the RoHC decompressor 32 according to one embodiment of the present disclosure. As illustrated, the receiving PDCP entity 28 receives a new PDCP PDU from the lower layer, which in the example of FIG. 2 is the RLC layer 24 (step 700). Using conventional PDCP processing, the receiving PDCP entity 28 determines a COUNT value for the new PDCP PDU as a function of the PDCP SN included in the new PDCP PDU and a HFN maintained by the receiving PDCP entity 28 (step 702). In particular, the COUNT value for the new PDCP PDU is computed as:

COUNT=COUNT_FUN(PDCP_SN,HFN$_{RX}$)

where COUNT_FUN is a function that represents the conventional process for generating COUNT based on the PDCP SN (PDCP_SN) included in the new received PDCP PDU and the HFN (HFT$_{RX}$) maintained by the receiving PDCP entity 28. While not essential, for more information regarding COUNT and COUNT_FUN, the interested reader is directed to 3GPP TS 36.323 V11.2.0, where COUNT_FUN represents the equation used to generate COUNT described in 3GPP TS 36.323 V11.2.0. As defined in 3GPP TS 36.323 V11.2.0, HFN$_{RX}$ is the HFN value for the generation of the COUNT value used for the received PDCP PDUs for the particular PDCP entity 28.

The receiving PDCP entity 28 then computes the size of the PDCP gap (g) as:

g=COUNT-COUNT$_{PREV}$+1 where COUNT is the value of COUNT computed in step 702 and COUNT$_{PREV}$ is the COUNT value computed for the previous PDCP PDU received by the receiving PDCP entity 28 (step 704). In one embodiment, during initialization of the receiving PDCP entity 28, COUNT$_{PREV}$ is initialized to $2^{32}-1$, and g is initialized to 0. Once the size of the PDCP gap (g) is computed, the receiving PDCP entity 28 sets COUNT$_{PREV}$ equal to the COUNT value computed for the current PDCP PDU (step 706) and makes the size of the PDCP SN gap (g) available to the RoHC decompressor 32 of the receiving PDCP entity 28 (step 708). The size of the PDCP SN gap (g) may be made available to the RoHC decompressor 32 using any suitable technique such as, for example, an API.

Figure 11:
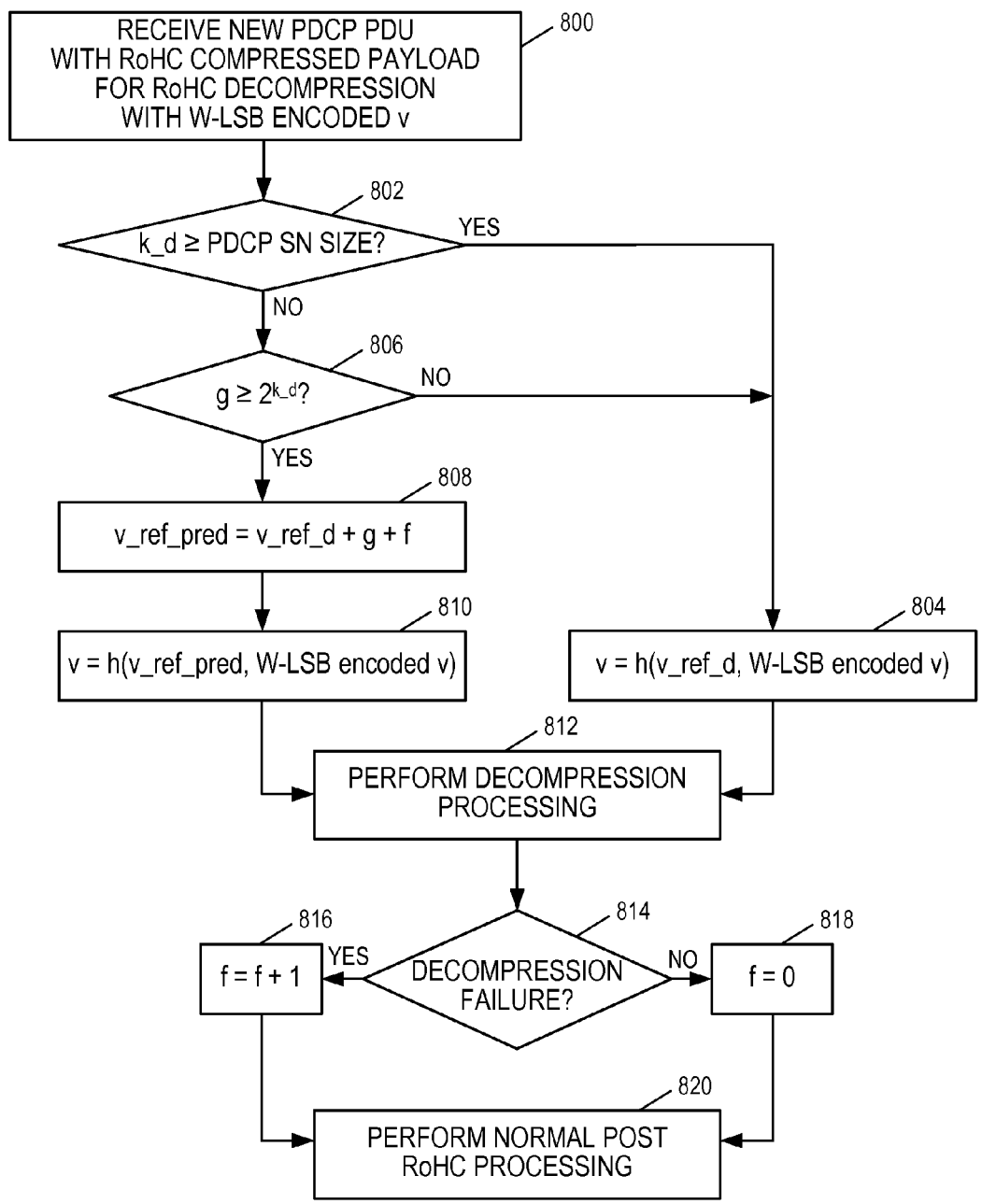
FIG. 11 illustrates a more detailed process for performing RoHC decompression including RoHC SN decoding based on the size of a PDCP SN gap according to one embodiment of the present disclosure.

FIG. 11 illustrates a RoHC decompression process that decodes the W-LSB encoded RoHC SN based on the size of the PDCP gap (g) according to one embodiment of the present disclosure. This process is performed by the RoHC decompressor 32. As illustrated, the RoHC decompressor 32 receives a RoHC compressed PDCP PDU for RoHC compression (step 800). The full value for the W-LSB encoded RoHC SN for the RoHC compressed PDCP PDU (i.e., the RoHC SN after decoding) is referred to as a value (v). The value (v) is encoded into k_c bits (or more depending on RoHC packet type selection) at the RoHC compressor 30 of the transmitting PDCP entity 28 to provide the W-LSB encoded RoHC SN (i.e., the compressed RoHC SN). The RoHC decompressor 32 determines whether the current value of k_d is greater than or equal to the size (i.e., number of bits) of the PDCP SN (step 802). According to the current PDCP standard for LTE, the size of the PDCP SN is either 7 or 12 bits, whereas k_d may be less than the size of the PDCP SN depending on the RoHC packet type. If the value of k_d is greater than or equal to the size of the PDCP SN, then the value of the PDCP gap (g) is not used for decoding the RoHC SN. As such, the RoHC decompressor 32 computes the value (v) for the RoHC SN in the conventional manner according to:

v=h(v_ref_d,W-LSB encoded v), where v_ref_d is the full RoHC SN of the last successfully decompressed PDCP PDU, W-LSB encoded v is the W-LSB encoded RoHC SN included in the received PDCP PDU, and h( ) represents the standard RoHC W-LSB decoding defined in the RoHC standard (step 804).

Returning to step 802, if the current value of k_d is less than the size of the PDCP SN, then the RoHC decompressor 32 determines whether the size of the PDCP SN gap (g) is greater than or equal to a threshold gap size, which in this example is $2^{k\_d}$ (step 806). If not, the process again proceeds to step 804 where the RoHC decompressor 32 computes the value (v) for the RoHC SN in the conventional manner. However, if the size of the PDCP SN gap (g) is greater than or equal to the threshold gap size, then the RoHC decompressor 32 will fail to successfully decompress the PDCP PDU using the conventional computation of the value (v) for the RoHC SN. As such, the RoHC decompressor 32 computes a predicted reference value (v_ref_pred) as:

v_ref_pred=v_ref_d+g+f where v_ref_d is the full RoHC SN of the last successfully decompressed PDCP PDU, g is the size of the PDCP SN gap, and f is the number of consecutive RoHC compressed PDCP PDUs that have failed decompression since the v_ref_d was set (i.e., since the last successfully decompressed PDCP PDU) (step 808). The initial value of f is 0. As discussed below, v_ref_d is a prediction of what v_ref_d would have been if the burst of packets had not been lost or failed to be decompressed. The RoHC decompressor 32 then computes the value (v) for the RoHC SN according to:

v=h(v_ref_pred,W-LSB encoded v)

(step 810). Normally, the last successful full RoHC SN (v_ref_d) is used with the W-LSB encoded RoHC SN of the received PDCP PDU to derive the full RoHC SN for the received PDCP PDU. However, since there is a gap, or burst, of lost packets that is larger than the window space of the W-LSB RoHC SN (which is $2^{k\_d}$), attempting RoHC decompression using the value (v) computed in the conventional manner based on v_ref_d would fail. In order to decrease the likelihood of decompression failure, the value (v) is instead computed based on v_ref_pred, which is the sum of v_ref_d plus the size of the PDCP SN gap (g) plus f. As such, v_ref_d is a prediction of what v_ref_d would have been if the burst of packets had not been lost or failed to be decompressed.

Next, whether proceeding from step 804 or step 810, once the value (v) is computed, the RoHC decompressor 32 performs decompression processing according to the RoHC standard using the computed value (v) for the full RoHC SN of the received RoHC compressed PDCP PDU (step 812). The RoHC decompressor 32 then determines whether there was a decompression failure (i.e., determines whether the RoHC compressed PDCP PDU was decompressed successfully) (step 814). If there was a compression failure, the counter (f) for the number of decompression failures is incremented (step 816). Otherwise, if decompression was successful, the RoHC decompressor 32 resets the counter (f) to 0 (step 818). Lastly, whether proceeding from step 816 or step 818, the RoHC decompressor 32 performs normal post RoHC processing (step 820). More specifically, if decompression fails, the packet is dropped. If decompression is successful, then in order delivery and duplicate detection processing is performed.

FIGS. 8 through 11 describe embodiments of a RoHC decompression process that utilizes the size of the PDCP SN gap (g) to compute the full RoHC SN in the event that the size of the PDCP SN gap (g) is greater than the window space of the W-LSB encoded RoHC SN. These embodiments use information that is already available in LTE and, in particular, PDCP. As a result, instead of a decompression failure and eventual recovery after a number of packets are discarded, the RoHC decompressor 32 is able to immediately recover without RoHC signaling and without packet loss. Further, while the W-LSB decoding and SN repair algorithm described in RFC 3095, Section 5.3.2.2.4 protects against a burst of up to $2^{k\_d+1}$ lost packets, the embodiments described above can protect against larger bursts of lost packets (i.e., greater than $2^{k\_d+1}$ lost packets) without signaling to the RoHC compressor 30 of the transmitting PDCP entity 28. Still further, the RoHC SN decoding as well as the repairing provided according to the embodiments above can be done in one pass, which increases decompression speed while decreasing the code complexity.

Note that while the description above describes embodiments at the RoHC compressor 30 (e.g., FIGS. 4-7) and embodiments at the RoHC decompressor 32 (e.g., FIGS. 8-11), it should be noted that the RoHC compressor embodiments and the RoHC decompressor embodiments are independent from one another. Thus, in a particular implementation, an embodiment of the proactive adaptation of the RoHC compressor 30 may be implemented with or without an embodiment of the RoHC decompressor 32 providing decoding of the RoHC SN based on the size of the PDCP SN gap, and vice versa. However, it should also be noted that an implementation may include both an embodiment of the proactive adaption of the RoHC compressor 30 and an embodiment of RoHC SN decoding based on the size of the PDCP SN gap.

Figure 12:
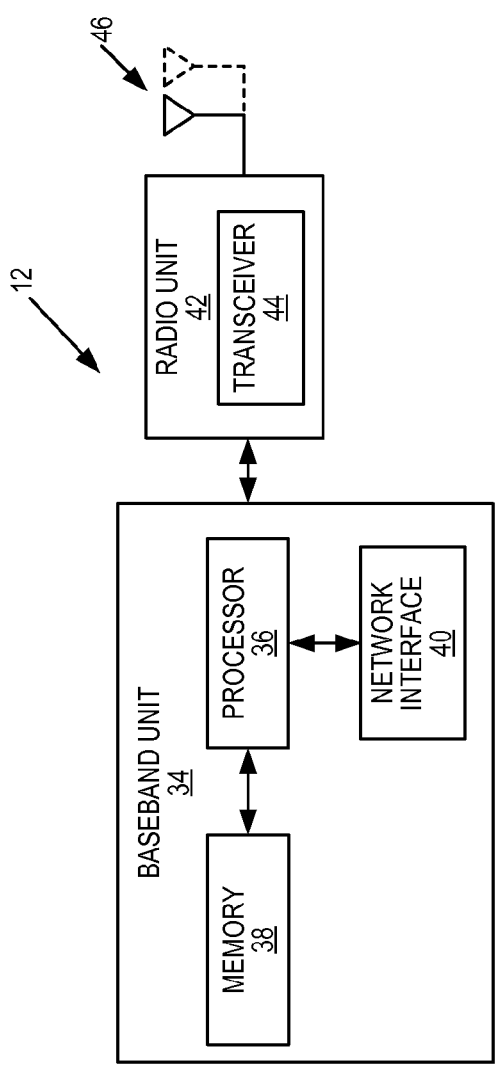
FIG. 12 is a block diagram of the base station of FIG. 1 according to one embodiment of the present disclosure.
Figure 13:
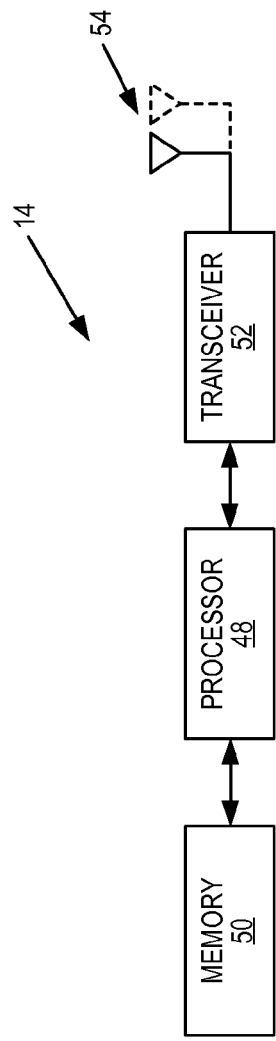
FIG. 13 is a block diagram of the wireless device of FIG. 1 according to one embodiment of the present disclosure.

The radio node 16 including the PDCP entitles 28 and the RoHC compressor 30 and/or the RoHC decompressor 32 can be implemented in any suitable hardware or combination of hardware and software. Using the base station 12 and the wireless device 14 of FIG. 1 as examples, FIG. 12 is a block diagram of one embodiment of the base station 12, and FIG. 13 is a block diagram of one embodiment of the wireless device 14. As illustrated in FIG. 12, the base station 12 includes a baseband unit 34 including a processor 36, memory 38, and a network interface 40 and a radio unit 42 including a transceiver 44 coupled to one or more antennas 46. In one embodiment, the functionality of the base station 12 described herein (particularly that of the PDCP layer 26, the PDCP entities 28, the RoHC compressor 30, and the RoHC decompressor 32) is implemented in software stored in the memory 38 and executed by the processor 36. Additionally, the base station 12 may include additional components responsible for providing additional functionality, including any of the functionality described above and/or any functionality necessary to support the embodiments described herein.

As illustrated in FIG. 13, the wireless device 14 includes a processor 48, memory 50, and a transceiver 52 coupled to one or more antennas 54. In one embodiment, the functionality described above as being provided by the wireless device 14 (and in particular the PDCP layer 26, the PDCP entities 28, the RoHC compressor 30, and the RoHC decompressor 32) is implemented in software stored in the memory 50 and executed by the processor 48. Alternative embodiments of the wireless device 14 may include additional components responsible for providing additional functionality, including any of the functionality identified above and/or any functionality necessary to support the embodiments described above.

Figure 14:
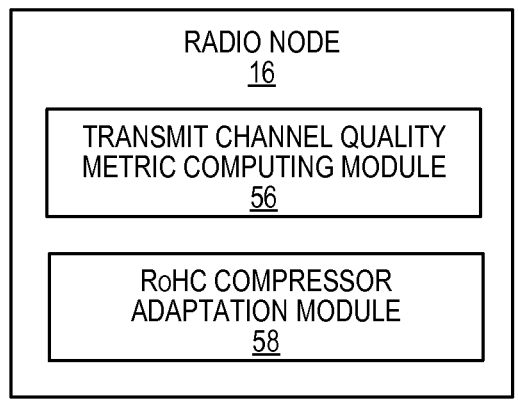
FIG. 14 is a block diagram of a radio node according to one embodiment of the present disclosure.

FIG. 14 is a block diagram of the radio node 16, e.g., either the base station 12 or the wireless device 14 of FIG. 1, according to one embodiment of the present disclosure. In this embodiment, the radio node 16 includes a transmit channel quality metric computing module 56 and a RoHC compressor adaptation module 58, each of which is implemented in software stored on a computer readable medium (e.g., the memory 38 or 50) that when executed by a processor (e.g., the processor 36 or 48) causes the radio node 16 to operate according to any one of the RoHC adaptation embodiments described above (e.g., any one of the embodiments of FIGS. 4-6). The transmit channel quality metric computing module 56 computes the channel quality metric (q), as discussed above. The RoHC compressor adaptation module 58 operates to adapt RoHC compression based on the channel quality metric (q), as discussed above.

Figure 15:
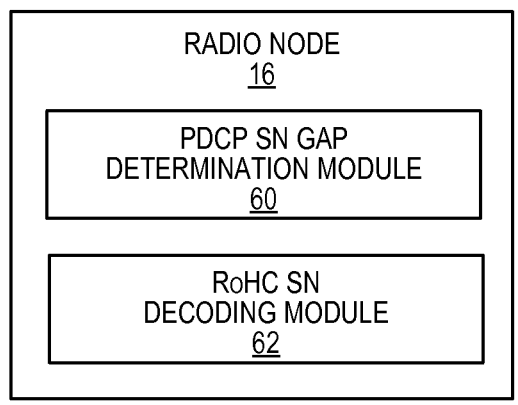
FIG. 15 is a block diagram of a radio node according to another embodiment of the present disclosure.

FIG. 15 is a block diagram of the radio node 16, e.g., either the base station 12 or the wireless device 14 of FIG. 1, according to another embodiment of the present disclosure. In this embodiment, the radio node 16 includes a PDCP SN gap determination module 60 and a RoHC SN decoding module 62, each of which is implemented in software stored on a computer readable medium (e.g., the memory 38 or 50) that when executed by a processor (e.g., the processor 36 or 48) causes the radio node 16 to operate according to any one of the RoHC SN decoding embodiments described above (e.g., any one of the embodiments of FIGS. 8-11). The PDCP SN gap determination module 60 computes the size of the PDCP SN gap (g), as discussed above. The RoHC SN decoding module 62 operates to decode the RoHC SN based on the size of the PDCP SN gap (g), as discussed above.

In one embodiment, a computer program is provided that includes instructions which, when executed on at least one processor, cause the at least one processor to carry out any of the embodiments of the radio node 16 (e.g., the base station 12 or the wireless device 14) described above. In one embodiment, a carrier containing the computer program is provided, wherein the carrier is one of an electronic signal, an optical signal, a radio signal, or a computer readable storage medium (e.g., a non-transitory computer readable medium).

The following acronyms are used throughout this disclosure.

| | |
|---|---|
| 3GPP | 3rd Generation Partnership Project |
| ACK | Acknowledgement |
| API | Application Programming Interface |
| ARQ | Automatic Repeat Request |
| BER | Bit Error Rate |
| CQI | Channel Quality Indicator |
| CRC | Cyclic Redundancy Check |
| DRB | Data Radio Bearer |
| eNB | Enhanced Node B |
| HARQ | Hybrid Automatic Repeat Request |
| HFN | Hyper Frame Number |
| ID | Identifier |
| IETF | Internet Engineering Task Force |
| IP | Internet Protocol |
| IR | Initialization and Refresh |
| LSB | Least Significant Bit |
| LTE | Long Term Evolution |
| MAC | Medium Access Control |
| MSN | Master Sequence Number |
| NACK | Negative Acknowledgement |
| O-MODE | Optimistic Mode |
| PDCP | Packet Data Convergence Protocol |
| PDU | Protocol Data Unit |
| PHY | Physical |
| R-MODE | Reliable Mode |
| RFC | Request for Comments |
| RLC | Radio Link Control |
| RoHC | Robust Header Compression |
| RSRP | Reference Signal Received Power |
| RSRQ | Reference Signal Received Quality |
| RTP | Real-Time Protocol |
| SDU | Service Data Unit |
| SN | Sequence Number |
| SNR | Signal-to-Noise Ratio |
| SRB | Service Radio Bearer |
| TS | Technical Specification |
| U-MODE | Unidirectional Mode |
| UDP | User Datagram Protocol |
| UE | User Equipment |
| VoIP | Voice over Internet Protocol |
| VoLTE | Voice over Long Term Evolution |
| W-LSB | Window-based Least Significant Bit |

Those skilled in the art will recognize improvements and modifications to the embodiments of the present disclosure. All such improvements and modifications are considered within the scope of the concepts disclosed herein and the claims that follow.

What is claimed is:

1. A method of operation of a radio node, comprising:
    determining a size of a Packet Data Convergence Protocol, PDCP, Sequence Number, SN, gap for a radio link between the radio node and a second radio node; and
    performing Robust Header Compression, RoHC, SN decoding based on the size of the PDCP SN gap by:
        receiving a new RoHC compressed PDCP Protocol Data Unit, PDU, for RoHC decompression;
        determining whether the size of the PDCP SN gap is greater than a threshold gap size;
        if the size of the PDCP SN gap is greater than or equal to the threshold gap size, computing a predicted reference value as a sum of a value of the RoHC SN for a last successfully decoded RoHC compressed PDCP PDU, the size of the PDCP SN gap, and a value for a decompression failure counter, the value for the decompression failure counter being a number of RoHC compressed PDCP PDUs that failed decompression since the last successfully decoded RoHC compressed PDCP PDU was received;
        computing a value for the RoHC SN for the new RoHC compressed PDCP PDU based on the predicted reference value and a Window-based Least Significant Bit, W-LSB, encoded RoHC SN value contained in the new RoHC compressed PDCP PDU; and
        performing RoHC decompression based on the value computed for the RoHC SN for the new RoHC compressed PDCP PDU.

2. The method of claim 1 wherein performing RoHC SN decoding based on the size of the PDCP SN gap further comprises determining the RoHC SN for the received new RoHC compressed PDCP PDU without using the size of the PDCP SN gap if the size of the PDCP SN gap is greater than the threshold gap size.

3. The method of claim 1 wherein the threshold gap size is $2^{k\_d}$ for a current value of k_d used by a RoHC decompressor of the radio node, where k_d is a number of least significant bits of the RoHC SN included in RoHC compressed PDCP PDUs processed by the RoHC decompressor.

4. The method of claim 1 further comprising:
    determining whether RoHC decompression failed for the new RoHC compressed PDCP PDU;
    if RoHC decompression failed, incrementing the value for the decompression failure counter; and
    if RoHC decompression succeeded, resetting the decompression failure counter.

5. The method of claim 1 wherein, if the size of the PDCP SN gap is less than the threshold gap size, computing the value of the RoHC SN for the new RoHC compressed PDCP PDU without using the size of the PDCP SN gap.

6. The method of claim 1 wherein performing RoHC SN decoding based on the size of the PDCP SN gap further comprises, prior to computing the value of the RoHC SN for the new RoHC compressed PDCP PDU:
    determining whether k_d is greater than or equal to the size of the PDCP SN, where k_d is a number of least significant bits of the RoHC SN included in RoHC compressed PDCP PDUs processed by the RoHC decompressor of the radio node;
    if k_d is not greater than or equal to the size of the PDCP SN, proceeding to perform the step of computing the value for the RoHC SN for the new RoHC compressed PDCP PDU based on the size of the PDCP SN gap if the size of the PDCP SN gap is greater than or equal to the threshold gap size; and
    if k_d is greater than or equal to the size of the PDCP SN, computing the value of the RoHC SN for the new RoHC compressed PDCP PDU without using the size of the PDCP SN gap if the size of the PDCP SN gap is less than the threshold gap size.

7. The method of claim 1 wherein the threshold gap size is $2^{k\_d}$, where k_d is a number of least significant bits of the RoHC SN included in the new RoHC compressed PDCP PDUs processed by the RoHC decompressor of the radio node.

8. The method of claim 1 wherein determining the size of the PDCP SN gap for the radio link between the radio node and the second radio node comprises:
    computing a count value for a received new PDCP PDU, the count value being composed of a Hyper Frame Number, HFN, maintained by a PDCP receiver of the radio node for the radio link between the radio node and the second radio node and a PDCP SN contained in the new PDCP PDU; and computing the size of the PDCP SN gap, g, as:

$$g = \text{COUNT} - \text{COUNT\_prev} + 1,$$

where COUNT is the count value computed for the new PDCP PDU and COUNT_prev is a count value computed for a previously received PDCP PDU.

9. The method of claim 1 wherein:

performing RoHC SN decoding based on the size of the PDCP SN gap is performed by the RoHC decompressor of the radio node for the radio link between the radio node and the second radio node;

determining the size of the PDCP SN gap is performed by a PDCP entity of the radio node; and the method further comprises making the size of the PDCP SN gap determined by the PDCP entity available to the RoHC decompressor.

10. A radio node comprising:

a processor; and memory containing software executable by the processor whereby the radio node is operative to:

determine a size of a Packet Data Convergence Protocol, PDCP, Sequence Number, SN, gap for a radio link between the radio node and a second radio node; and perform Robust Header Compression, RoHC, SN decoding based on the size of the PDCP SN gap by being operative to:

receive a new RoHC compressed PDCP Protocol Data Unit, PDU, for RoHC decompression;

determine whether the size of the PDCP SN gap is greater than a threshold gap size;

if the size of the PDCP SN gap is greater than or equal to the threshold gap size, compute a predicted reference value as a sum of a value of the RoHC SN for a last successfully decoded RoHC compressed PDCP PDU, the size of the PDCP SN gap, and a value for a decompression failure counter, the value for the decompression failure counter being a number of RoHC compressed PDCP PDUs that failed decompression since the last successfully decoded RoHC compressed PDCP PDU was received;

compute a value for the RoHC SN for the new RoHC compressed PDCP PDU based on the predicted reference value and a Window-based Least Significant Bit, W-LSB, encoded RoHC SN value contained in the new RoHC compressed PDCP PDU; and perform RoHC decompression based on the value computed for the RoHC SN for the new RoHC compressed PDCP PDU.

11. The radio node of claim 10 wherein being operative to perform RoHC SN decoding based on the size of the PDCP SN gap further comprises being operative to determine the RoHC SN for the received RoHC compressed PDCP PDU without using the size of the PDCP SN gap if the size of the PDCP SN gap is greater than the threshold gap size.

12. The radio node of claim 10 wherein the threshold gap size is $2^{k\_d}$ for a current value of k_d used by a RoHC decompressor of the radio node, where k_d is a number of least significant bits of the RoHC SN included in the new RoHC compressed PDCP PDUs processed by the RoHC decompressor.

13. The radio node of claim 10 further operative to:

determine whether RoHC decompression failed for the new RoHC compressed PDCP PDU;

if RoHC decompression failed, increment the value for the decompression failure counter; and if RoHC decompression succeeded, reset the decompression failure counter.

14. The radio node of claim 10 further operative to, if the size of the PDCP SN gap is less than the threshold gap size, compute the value of the RoHC SN for the new RoHC compressed PDCP PDU without using the size of the PDCP SN gap.

15. The radio node of claim 10 wherein being operative to perform RoHC SN decoding based on the size of the PDCP SN gap further comprises being operative to, prior to computing the value of the RoHC SN for the new RoHC compressed PDCP PDU:

determine whether k_d is greater than or equal to a size of the PDCP SN, where k_d is a number of least significant bits of the RoHC SN included in the new RoHC compressed PDCP PDUs processed by the RoHC decompressor of the radio node;

if k_d is not greater than or equal to the size of the PDCP SN, proceed to perform the step of computing the value for the RoHC SN for the new RoHC compressed PDCP PDU based on the size of the PDCP SN gap if the size of the PDCP SN gap is greater than or equal to the threshold gap size; and if k_d is greater than or equal to the size of the PDCP SN, compute the value of the RoHC SN for the new RoHC compressed PDCP PDU without using the size of the PDCP SN gap if the size of the PDCP SN gap is less than the threshold gap size.

16. The radio node of claim 10 wherein the threshold gap size is $2^{\wedge} k\_d$, where k_d is a number of least significant bits of the RoHC SN included in the new RoHC compressed PDCP PDUs processed by the RoHC decompressor of the radio node.

17. The radio node of claim 10 wherein being operative to determine the size of the PDCP SN gap for the radio link between the radio node and the second radio node comprises being operative to:

compute a count value for a received new PDCP PDU, the count value being composed of a Hyper Frame Number, HFN, maintained by a PDCP receiver of the radio node for the radio link between the radio node and the second radio node and a PDCP SN contained in the new PDCP PDU; and compute the size of the PDCP SN gap, g, as:

$$g = \text{COUNT} - \text{COUNT\_prev} + 1,$$

where COUNT is the count value computed for the new PDCP PDU and COUNT_prev is a count value computed for a previously received PDCP PDU.

18. A method of operation of a radio node, comprising:

determining a size of a Packet Data Convergence Protocol, PDCP, Sequence Number, SN, gap for a radio link between the radio node and a second radio node; and performing Robust Header Compression, RoHC, SN decoding based on the size of the PDCP SN gap by:

receiving a new RoHC compressed PDCP Protocol Data Unit, PDU, for RoHC decompression;

determining whether the size of the PDCP SN gap is greater than a threshold gap size;

if the size of the PDCP SN gap is greater than or equal to the threshold gap size, computing a value for a RoHC SN for the new RoHC compressed PDCP PDU based on the size of the PDCP SN gap; and performing RoHC decompression based on the value computed for the RoHC SN for the new RoHC compressed PDCP PDU by:
- determining whether k_d is greater than or equal to a size of the PDCP SN, where k_d is a number of least significant bits of the RoHC SN included in RoHC compressed PDCP PDUs processed by the RoHC decompressor of the radio node;
- if k_d is not greater than or equal to the size of the PDCP SN, proceeding to perform the step of computing the value for the RoHC SN for the new RoHC compressed PDCP PDU based on the size of the PDCP SN gap if the size of the PDCP SN gap is greater than or equal to the threshold gap size; and
- if k_d is greater than or equal to the size of the PDCP SN, computing the value of the RoHC SN for the new RoHC compressed PDCP PDU without using the size of the PDCP SN gap if the size of the PDCP SN gap is less than the threshold gap size.

* * * * *